(12) United States Patent
Jin et al.

(10) Patent No.: US 7,735,147 B2
(45) Date of Patent: Jun. 8, 2010

(54) PROBE SYSTEM COMPRISING AN ELECTRIC-FIELD-ALIGNED PROBE TIP AND METHOD FOR FABRICATING THE SAME

(75) Inventors: Sungho Jin, San Diego, CA (US);
Li-Han Chen, San Diego, CA (US);
I-Chen Chen, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 198 days.

(21) Appl. No.: 12/088,223

(22) PCT Filed: Oct. 10, 2006

(86) PCT No.: PCT/US2006/039824
§ 371 (c)(1),
(2), (4) Date: Mar. 26, 2008

(87) PCT Pub. No.: WO2007/047337
PCT Pub. Date: Apr. 26, 2007

(65) Prior Publication Data
US 2008/0272299 A1 Nov. 6, 2008

(51) Int. Cl.
*H01J 37/06* (2006.01)
(52) U.S. Cl. .......................................... 850/21; 73/105
(58) Field of Classification Search ................... 850/21; 73/105; 250/306
See application file for complete search history.

(56) References Cited

U.S. PATENT DOCUMENTS 6,864,481 B2 * 3/2005 Kaito et al. ................. 250/306
6,930,313 B2 * 8/2005 Fujieda et al. ........... 250/423 R
7,082,683 B2 * 8/2006 Han et al. ...................... 29/874
7,452,432 B2 * 11/2008 Kim et al. ...................... 156/64
7,511,270 B2 * 3/2009 Nakayama et al. .......... 250/309

OTHER PUBLICATIONS

G. Reiss, et al, Scanning tunneling microscopy on rough surfaces: Tip-shape-limited resolution; J. Appl. Phys, 67 (3) 1156; Feb. 1, 1990.
J.E. Griffith, et al; Scanning probe metrology; J. Vac. Sci. Technol. A 10 (4); 674, (1992).
V.I. Merkolov, et al; Controlled alignment of carbon nanofibers in a large-scale synthesis process; Applied Physics Letters, vol. 80, No. 25, 4816; Jun. 24, 2002.

(Continued)

*Primary Examiner*—Kiet T Nguyen
(74) *Attorney, Agent, or Firm*—Sanford Astor; Lewis Brisbols Bisgaard & Smith LLP

(57) ABSTRACT

A mechanically stable and oriented scanning probe tip comprising a carbon nanotube having a base with gradually decreasing diameter, with a sharp tip at the probe tip. Such a tip or an array of tips is produced by depositing a catalyst metal film on a substrate (10 & 12 in FIG. 1(*a*)), depositing a carbon dot (14 in FIG. 1(*b*)) on the catalyst metal film, etching away the catalyst metal film (FIG. 1(*c*)) not masked by the carbon dot, removing the carbon dot from the catalyst metal film to expose the catalyst metal film (FIG. 1(*d*)), and growing a carbon nanotube probe tip on the catalyst film (16 in FIG. 1(*e*)). The carbon probe tips can be straight, angled, or sharply bent and have various technical applications.

26 Claims, 25 Drawing Sheets

OTHER PUBLICATIONS

J.F. Aubuchon, et al; Multiple Sharp Bendings of Carbon Nanotubes during Growth to Produce Zigzag Morphology; Nano Letters, Vo. 4, No. 9; 1781; 2004.

H. Dai, et al; Nanotubes as nanoprobes in scanning probe microscopy; Nature, vol. 384; 147; Nov. 14, 1996.

H. Nishijima, et al; Carbon-nanotube tips for scanning probe microscopy: Preparation by a controlled process and observation of deoxyribonucleic acid; Applied Physics Letters, vol. 74, No. 26, 4061, Jun. 28, 1999.

R. Stevens, et al; Improved fabrication approach for carbon nanotube probe devices; Applied Physics Letters, vol. 77, No. 21; 3453, (Nov. 20, 2000).

A. Hall et al; Simple and efficient method for carbon nanotube attachment to scanning probes and other substrates; Applied Physics Letters, vol. 82, No. 15, 2506 (Apr. 14, 2003).

J. Tang, et al; Rapid and Reproducible Fabrication of Carbon Nanotube AFM Probes by Dielectrophoresis; Nano Letters, vol. 5, No. 1; 11 (2005).

J. Hafner, et al; Growth of nanotubes for probe microscopy tips; Nature, vol. 398, 761, (1999).

C. Cheung, et al; Growth and fabrication with single-walled carbon nanotube probe microscopy tips; Applied Physics Letters; vol. 76, No. 21; 3136 (May 22, 2000).

E. Yenilmez, et al; Wafer scale production of carbon nanotube scanning probe tips for atomic force microscopy; Applied Physics Letters, vol. 80, No. 12; 2225 (Mar. 25, 2002).

E. S. Snow, et al; Single-wall carbon nanotube atomic force microscope probes; Applied Physics Letters, vol. 80, No. 11; 2002 (Mar. 18, 2002).

A. N. Broers, et al; Electron-beam fabrication of 80-A metal structures; Applied Physics Letters, vol. 29, No. 9; 596 (Nov. 1, 1976).

Q. Ye, et al; Large-Scale Fabrication of Carbon Nanotube Probe Tips for Atomic Force Microscopy Critical Dimension Imaging Applications; Nano Letters, vol. 4, No. 7; 1301 (2004).

H. Cui, et al; Growth of Carbon Nanofibers on Tipless Cantilevers for High Resolution Topography and Magnetic Force Imaging; Nano Letters, vol. 4, No. 11; 2157 (2004).

* cited by examiner

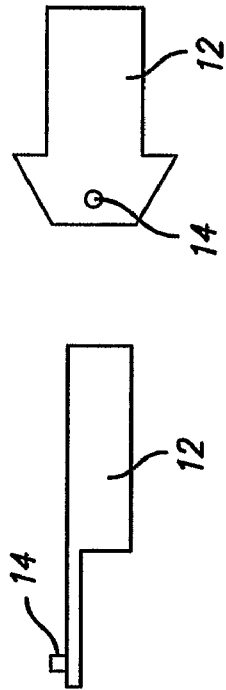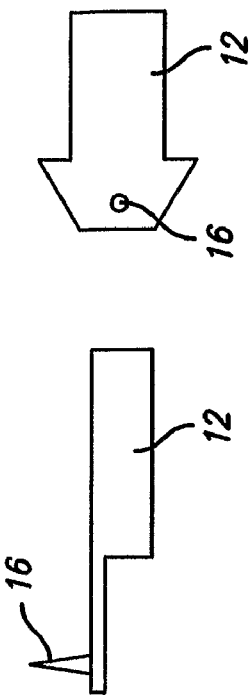
(D) REMOVAL OF CARBON DOTS BY OXYGEN REACTIVE ION ETCH
(E) CARBON NANOCONE GROWTH
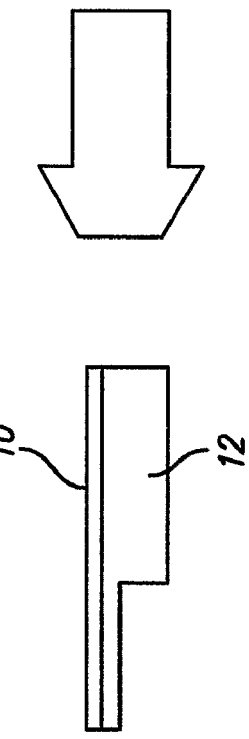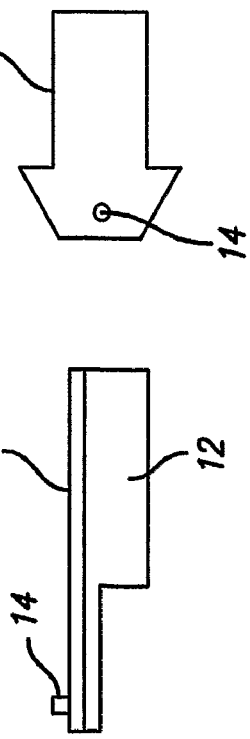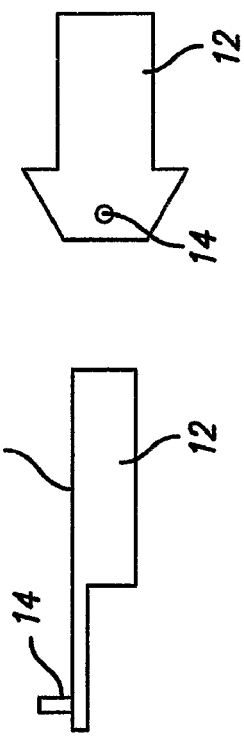
(A) CATALYST LAYER DEPOSITION
(B) ELECTRON BEAM INDUCED DEPOSITION OF CARBON DOTS
(C) METAL WET ETCHING
FIG. 1

- SINGLE CNF GROWN ON THE TIPLESS CANTILEVER BY DC-PECVD
- LENGTH OF CNF ~2um

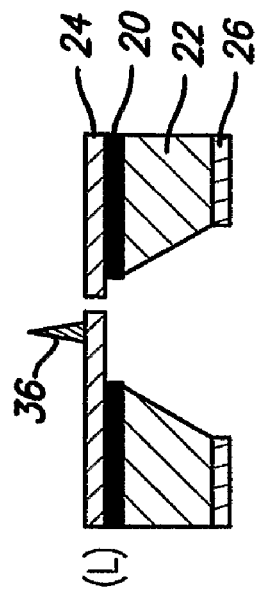
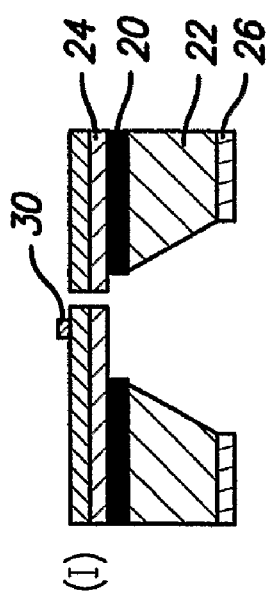
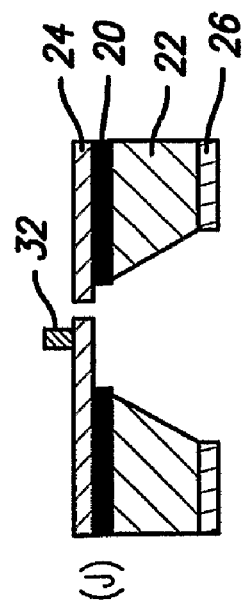
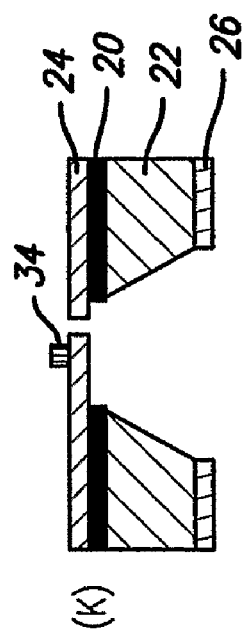
FIG. 4-2

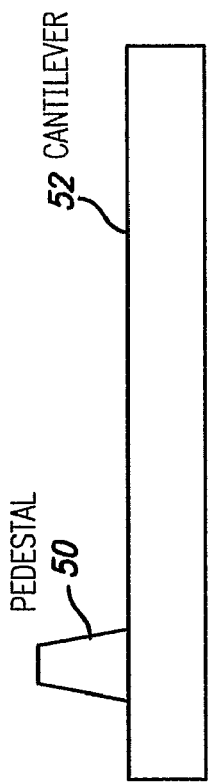
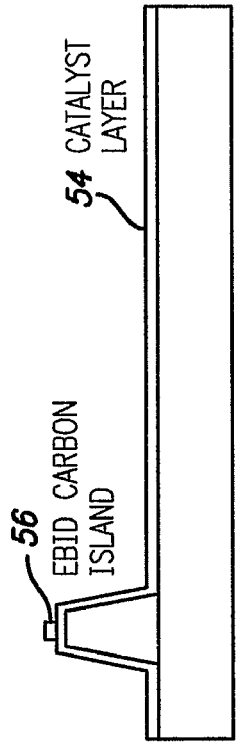
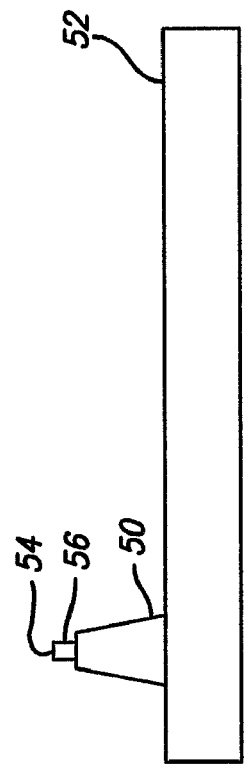
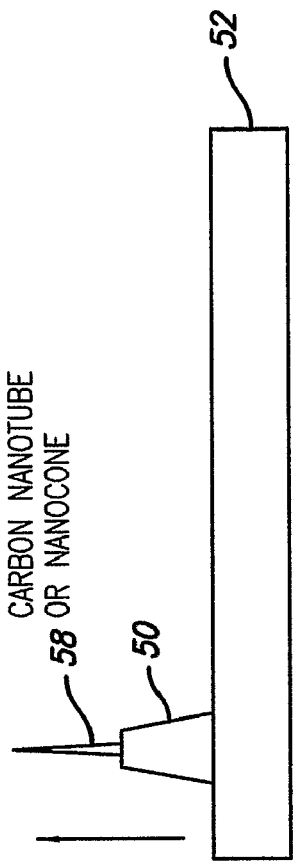

FIG. 6

(A) ADD A HEIGHT-RAISING PEDESTAL ONTO AFM PROBE CANTILEVER BY SILICON FAB TECHNIQUE (B) APPLY A CATALYST LAYER COATING (E.G., Ni, Co, Fe, Pd OR THEIR ALLOYS) BY SPUTTERING, EVAPORATION, ELECTROPLATING, AND THEN USE THE EBID PROCESS TO DEPOSIT A SINGLE CARBON MASK ISLAND (C) ETCH AWAY CATALYST LAYER EXCEPT THE MASKED ISLAND REGION (D) REMOVE THE CARBON ISLAND AND CARRY OUT THE CVD GROWTH OF CARBON NANOTUBE OR NANOCONE IN ELECTRIC FIELD

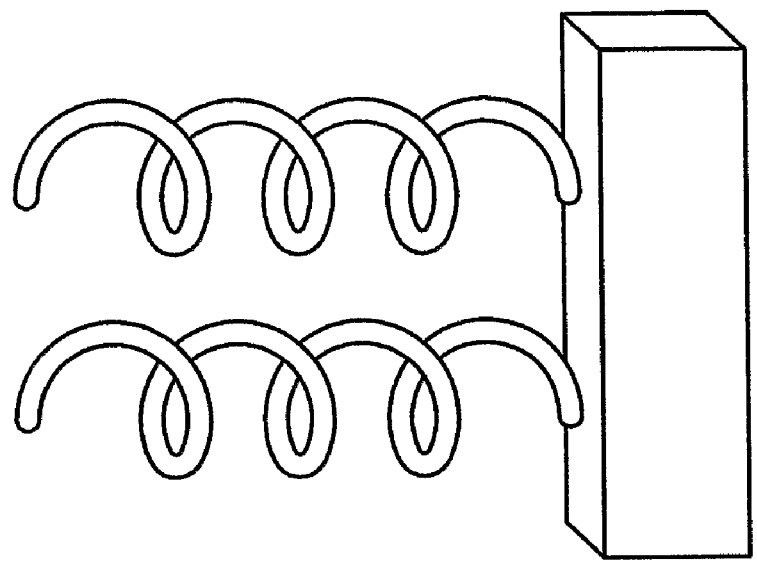
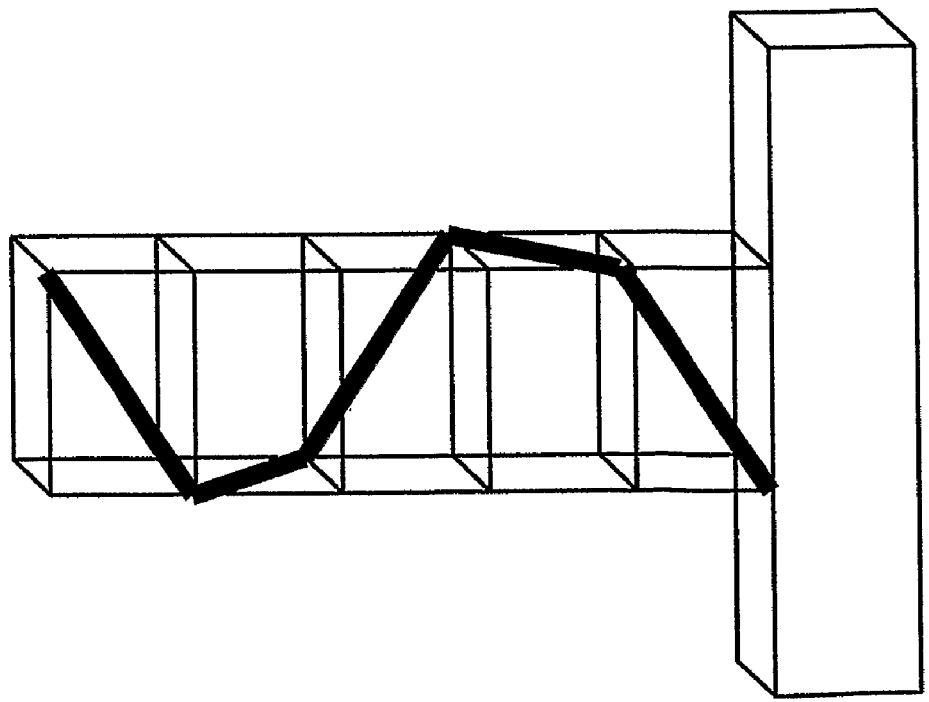
FIG. 11

PROBE SYSTEM COMPRISING AN ELECTRIC-FIELD-ALIGNED PROBE TIP AND METHOD FOR FABRICATING THE SAME

BACKGROUND OF THE INVENTION

1. Field of Invention

The present invention relates to scanning probe microscopy systems, in particular, atomic force microscopy systems comprising carbon nanotube tips, and methods for fabricating such tips.

2. Discussion of the Related Art

Scanning probe microscopy (SPM) such as atomic force microscopy (AFM) has been an important and powerful technique for resolving nanoscale features, and thus has been utilized for various scientific, engineering, and biological applications. The key component of SPM is the probe tip, as the resolution of SPM imaging is determined by its sharpness, size and shape. See articles by G. Reiss, et al, "Scanning tunneling microscopy on rough surfaces: tip-shape-limited resolution", J. Appl. Phys. 67, 1156 (1990), and by J. E. Griffith et al, "Scanning probe metrology", J. Vac. Sci. Technol. A 10, 674 (1992).

Typical commercially available SPM probe tips are made of silicon or silicon nitride microfabricated into a pyramid configuration. Such probes are often easily broken or worn out during long time operation. They also generally exhibit a limited lateral resolution, and their rigid pyramid shape does not allow easy access to narrow or deep structural features.

Carbon nanotubes (CNTs) have attracted much attention due to their various interesting physical and chemical properties. The high aspect ratio geometry and the nano-scale diameter of the CNT offer obvious advantages for imaging as an AFM probe. Moreover, due to its good mechanical flexibility, such a CNT probe is also suitable for studying soft matters such as biological samples with minimal damage.

Carbon nanotubes (CNTs), either single wall carbon nanotubes (SWNTs) or multiwall nanotubes (MWNTs) can be grown in a controlled manner using chemical vapor deposition (CVD) processing. Carbon nanotubes with graphene walls parallel to the axis of the nanotube as well as those with graphene walls at an angle to the axis of the nanotube can be grown. The latter type of carbon nanotubes, sometimes called nanofibers, still have a nanoscale tube configuration, and hence will be referred throughout this disclosure as nanotubes. Vertically aligned, periodically spaced MWNTs can be grown in a controlled manner using DC-plasma enhanced CVD process using an applied electric field. See V. I. Merkulov, et al, Appl. Phys. Lett. 80, 4816 (2002), J. F. AuBuchon, et al, Nano Letters 4, 1781 (2004).

There have been several approaches developed for fabrication of CNT based probes. Most approaches are based on attaching CNTs (mostly multiwall nanotubes) on commercial pyramid tips by acrytic adhesive, electric field, arc welding, magnetic field and liquid phase dielectrophoresis. See articles by H. Dai, et al, Nature 384, 147 (1996), H. Nishijima, et al, Appl. Phys. Lett. 74, 4061 (1999), by R. Stevens, et al, Appl. Phys. Lett. 77, 3453 (2000), by A. Hall, et al, Appl. Phys. Lett. 82, 2506 (2003), and by J. Tang, et al, Nano Lett. 5, 11 (2005).

These methods are operated manually and are time consuming. The attachment angle, the number of CNTs attached, and adhesion strength are not always controllable. A direct growth of CNTs with catalyst particles or catalyst film coating on Si tips by thermal CVD has also been reported. See articles by J. H. Hafner, et al, Nature 398, 761 (1999), by C. L. Cheung et al, Appl. Phys. Lett. 76, 3136 (2000), and by E. Yenilmez, et al, Appl. Phys. Lett. 80, 2225 (2002). While such an approach can potentially lead to wafer scale production of AFM tips, there are some major issues that need to be resolved for practical SPM applications to materialize:

i) The reproducibility and reliability in shape, size, and attachment angle of nanotube probes is yet to be established. Snow et al. reported the effect of the attachment angle of the CNT tip with respect to the cantilever body for AFM imaging. It was shown that a tilt attachment angle of the CNT can severely reduce the imaging performance. See E. S. Snow, et al, Appl. Phys. Lett. 80, 2002 (2002).

ii) The frequent presence of undesirable multiple nanotubes at the probe tip, instead of a desirable single nanotube is a problem. This is often seen during the prior art in-situ CVD growth of nanotubes from AFM pyramid tips, due to the presence of multiple catalyst particles, as it is not always easy to place just a single catalyst island at the pyramid apex. The presence of such multiple nanotubes at the probe tip, some of which tangle with each other, is highly undesirable as it complicates the AFM imaging and interpretations.

iii) To ensure a suitable length of CVD-grown CNTs for imaging, an electric pulse cutting technique has been developed to shorten CNT on the tip during AFM operation. This process is tedious because every CVD-grown CNT tip has to be checked and trimmed individually. See J. H. Hafner, et al, Nature 398, 761 (1999).

iv) The attachment or growth of too small a diameter nanotube such as a single wall nanotube (SWNT) with a diameter of ~1.2 nm induces an instability problem, especially if the probe length is made reasonably long for ease of probe handling and fabrication as well as for ease of access into deep cavities. Such a thin and long probe tends to vibrate with high frequency, thus the lateral position and resolution of the probe tend to get deteriorated.

Therefore there is a need to find an improved SPM or AFM probe configuration and fabrication technique in order to resolve these serious issues. This invention discloses a simple, reliable and protection-layer-free technique of fabricating a single SPM probe on the cantilever and unique probe tip structures by utilizing the unique direct-write feature of the electron-beam-induced carbon island deposition. Electron beam induced deposition (EBID) of carbon is a novel writing technique to directly fabricate nanopatterns on the substrate bypassing the use of any resist-layer-related steps. The technique is especially useful for creating a pattern on sample substrate edges, especially on tiny samples such as a pre-fabricated tipless cantilever. The resultant formation of a nano island metal catalyst pattern allows a growth of a sharp, high-aspect-ratio nanotube probe structure with desired mechanical stability by an electric-field-guided CVD process.

SUMMARY OF THE INVENTION

The present invention comprises an improved design of scanning probe tip configuration and a method for fabricating a single or an array of electrical-field aligned nanotips on cantilevers.

According to one aspect of the present invention, a mechanically stable scanning probe tip configuration having a larger carbon nanotube diameter at the base with a gradually decreasing diameter with very sharp tip at the probe end, preferably with no tip-radius-reducing catalyst particle present at the very tip of the probe.

Another aspect of the invention is to have such a mechanically stable and sharp-tipped probe as well as a nanotube or nanowire probe which is angled or bent for additional three-dimensional probing capability.

Yet another aspect of the invention is to have a probe tip structure comprising a two-stage, vertically hierarchical, nanotube structure to provide a high spatial resolution in combination with mechanical stability. The two-stage hierarchical nanotube structure consists of a larger-sized, mechanically sturdier nanocone base and a small-sized, much thinner, compliant nanotube probe CVD grown at the apex of the larger nanocone base.

Yet another aspect of the invention is to have an array of such mechanically stable and sharp probe tips, either straight, angled, sharply bent, or two-stage hierarchical structured.

According to another aspect of the present invention, a convenient method of fabricating a single, electrical-field-aligned nanotip on a substrate or on a conventional cantilever structure is provided. The process comprises steps of depositing a catalyst film on substrate or on cantilever, depositing an etch mask made of a carbon dot at the desirable position, removing excess catalyst material from the cantilever surface, and growing the nanotip on the predetermined position, with a predetermined angle and dimension by electric-field-guided CVD process.

The probe systems comprising the improved and unique probe tip structures are useful for a variety of applications including high-resolution metrology devices, nanoscale mechanical testing systems, conductance probes, sidewall probes, magnetic force microscopy, nanoscale e-beam writing systems, for nano-pattern fabrication, magnetic recording head systems, electrostatic recording systems, thermal probe memory write systems, and biological cell manipulation and test systems.

BRIEF DESCRIPTION OF THE DRAWINGS

The nature, advantages and various additional features of the invention will appear more fully upon consideration of the illustrative embodiments now to be described in detail with the accompanying drawings. In the drawings:

FIGS. 6(a)-(d) schematically illustrate the process of fabricating pedestal-based taller AFM probes using the EBID process.

FIGS. 11(a)-(b) represent a box helix or coil-shaped nanotip probe system according to the invention.

Figure 2:
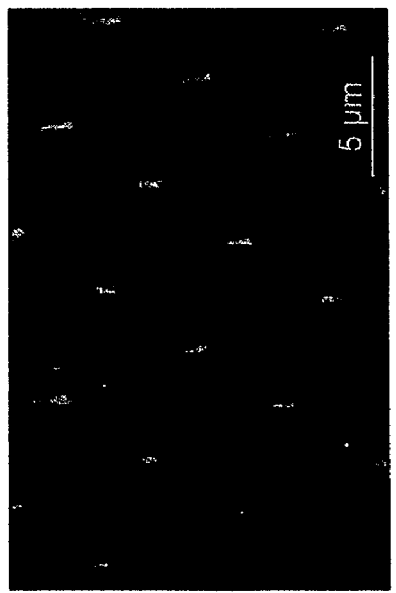
FIG. 2 is an SEM micrograph of an array of carbon nanocone probe tips obtained by EBID patterning of Ni catalyst followed by CVD growth.

It is to be understood that the drawings are for purposes of illustrating the concepts of the invention and are not to scale.

DETAILED DESCRIPTION OF THE INVENTION

The invention and the various features and advantageous details thereof are explained more fully with reference to the exemplary embodiments that are illustrated in the accompanying drawings and detailed in the following description. Descriptions of well known starting materials, processing techniques, components, and equipment are omitted so as not to obscure the invention in detail. It should be understood however, that the detailed description and the specific examples, while indicating preferred embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

The present invention relates to a novel method of fabricating a single or an array of high-aspect-ratio nanotips on any type of substrate or cantilever, such as Si, Si-nitride or other types of substrates. An exemplary, first fundamental embodiment of the present invention will be explained below with reference to FIG. 1(a)-(e). In accordance with FIG. 1(a), a catalyst metal film 10 is first deposited on a substrate 12 or on a cantilever structure. Suitable deposition methods of catalyst metal film can be sputtering, chemical vapor deposition, e-beam evaporation, thermal evaporation, electroless deposition, or electroplating. The catalyst metal can be Fe, Co, Ni, Pd or an alloy containing one or more of these elements.

In accordance with the invention and with reference to FIG. 1(b), a carbon dot 14, comprising primarily amorphous carbon is deposited on a desirable position on the substrate or the cantilever structure by electron-beam-induced deposition (EBID) method. Electron beam induced deposition (EBID) of carbon is a novel writing technique to directly fabricate nanopatterns on the substrate bypassing the use of any resist layer related steps. The carbon depositon is caused by dissociation of volatile molecules adsorbed on the substrate into a nonvolatile deposit via high-energy focused electron beam available in common scanning electron microscopes. The system for EBID can be any vacuum system with focus electron beam, such as scanning electron microscope with the software which is capable of controlling the position and dwelling time of the e-beam. The residual carbon-containing molecules naturally present in the chamber were sufficient for the needed EBID processing, to form amorphous carbon dots on the sample surface. The specific carbonaceous precursor and/or metal-organic precursor, such as W(CO)6, can also be intentionally introduced to the system chamber as carbon or metal-carbon mixture source. The carbon dot 14 with a selected diameter of 50 nm to 500 nm is formed on the substrate 12 or the cantilever by EBID method. The base pressure used can be typically below $10^{-5}$ torr evacuated for example by mechanical pump and turbo pump. The carbon dot 14 deposition time is varied by adjusting beam current and desired size of the carbon dot. As an alternative to the above-described production of carbon-based dots, focus ion beam deposition may also be used.

The carbon dot mask approach for fabrication of carbon nanotube probes is especially convenient as this can be applied on a substrate which is not a large area substrate or on a sample which is not flat but have protruding structures, for example, having steps or pyramids. In comparision, the standard e-beam lithography mask technique requires a relatively large and flat surface to carry out spin coating of e-beam resist material.

Referring to FIG. 1(c), the carbon dot 14 serves as a convenient etch mask for the catalyst metal etch process. The portion of the Ni film that is not masked by the carbon dot 14 can be etched away by using wet etching or reactive ion etching (RIE). Then, the catalyst island beneath the carbon dot 14 remains after the etching process. A wet etching solution which is capable of use in the Ni etch process, is $[H_3PO_4]$:$[HNO_3]$: $[CH_3COOH]$: $[H_2O]$=1:1:1:2. The suitable reactive ion etch (RIE) process may use, for example, $Cl_2$ or $BCl_3$ based gas for Ni etching in high ion density RIE systems, such as ICP-RIE, ECR-RIE.

The removal of carbon dots is typically performed with oxygen reactive ion etch for 0.1-10 minutes, typically about 1 min, which exposes the Ni nano island as illustrated in FIG. 1(d). Instead of reactive ion etch, a simple oxidation (burning) may also be used to remove the carbon dot. However, the catalyst may also get oxidized, so a hydrogen reduction heat treatment may have to be added to reduce the oxidized catalyst back to the metallic state.

The substrate or cantilever structure with the Ni nano-island is then transferred to the DC plasma CVD system for subsequent nucleation and growth of a carbon nanotube 16 or nanocone, see FIG. 1(e). The CVD growth of the carbon nanocone probe tip 16 is typically carried out, for example, at 700° C. for 10-20 min using a mixture of $NH_3$ and $C_2H_2$ gas (ratio 4:1) at 3 mtorr pressure. Preferably, an applied electric field (at a bias voltage of 550 V) is utilized to guide the growth of the nanofiber along the desired direction.

Making a pattern near the edge of a commercial tipless cantilever is not as simple as on a conventional, large-area substrate, because PMMA cannot be uniformly coated on such a small area of cantilever by spin coating and special care has to be taken for alignment, either by placing a separate alignment on the cantilever, or use the edge/corner of the cantilever as an alignment mark. It will cost an extra electron beam lithography process to remove excess catalyst due to these complications. Compared to the typical electron beam lithography approach of preparing a single dot pattern on a small form factor cantilever, utilizing the resist free, EBID process can avoid these problems and also allows in-situ alignment due to the high magnification of x30,000 or higher available in the same SEM environment.

While the use of such an EBID carbon dot has been reported as dry etching mask (see, A. N. Broers, et al, Appl. Phys. Lett. 29, 596 (1976)), there has been no report for its use as a wet etching mask. On testing of chemical etchability of the carbon dots in the present invention using various acids and other chemicals such as HCl, HF, $HNO_3$, $H_2O_2$ and acetone, it has been discovered that the carbon dots fabricated according to the invention are very stable and remain adherent on the substrate after the exposure to the chemicals. The carbon dots have a unique advantage in that while they are resistant to chemical etching, they are easily removable by oxygen reactive ion etching (RIE). The oxygen RIE process does not chemically affect the Ni film much or reduce its catalytic activity for carbon nanotube nucleation and growth during subsequent CVD. An important experimental observation on CVD growth of nanotubes using the EBID carbon dot as an etch mask is that the diameter of the carbon nanodot mask (and hence the diameter of the 10 nm thick Ni catalyst island underneath) should be smaller than ~250 nm in order to avoid the undesirable nucleation and growth of multiple carbon nanotubes or nanocones and produce only a single probe of nanotube or nanocone. The desired diameter of a carbon nanodot for single probe fabrication in the inventive process is less than 300 nm, preferably less than 200 nm, even more preferably less than 100 nm.

The new approach of EBID-based carbon nano-island mask for desirable probe tip fabrication on cantilever, according to the invention, is much more convenient than the previously known, standard electron beam lithography technique. Examples of such prior art, electron beam lithography based probe tip fabrication have recently been described by Q. Ye, et al, Nano Letters 4, 1301 (2004), by H. Cui,et al, Nano Letters 4, 2157 (2004), and by M. A. Guillorn, et al, U.S. Patent Application No. 20050103993.

Both Ye and Cui used a lift-off process following polymethyl methacrylate (PMMA) resist layer coating and a typical electron beam lithography process to make catalyst island patterns on cantilevers. In Ye's case, patterned catalyst dots were formed by electron beam lithography before the fabrication of the cantilevers, but the catalyst had to be protected by plasma-enhanced CVD coating of a $Si_3N_4$ layer in order for the catalyst dots to survive and keep catalytic activity after microfabrication steps.

In Cui's case, the electron beam lithography steps had to be used twice to pattern catalyst dots on the commercial tipless cantilevers in order to remove extra Ni catalyst on the cantilever. In the Guillorn's case, the carbon nanotube was grown prior to cantilever fabrication and then a $Si_3N_4$ protection layer was deposited in order to protect the nanotube probe during the subsequent microfabrication process. Q. Ye et al. showed that the nanotubes would be severely damaged or totally removed from the Si cantilever by this process. These prior art probe fabrication approaches with typical photolithography or e-beam lithography require somewhat complicated, multiple patterning steps. The preferred inventive process using a carbon dot as an etch mask enables a convenient fabrication of a single, nanotube-based, SPM probe thus bypassing some of the complicated fabrication steps and associated damages to the probes.

The use of e-beam lithography based generation of a catalyst island is, however, not excluded in this invention, for fabrication of carbon nanocone structures, especially those with bent or spring-like probe configurations as well as various surface modified probes such as coated with dielectric material, highly conductive material, low work function material, magnetically soft or permanent magnet material, mechanically harder coating material, adhesion-enhancing coating, and so forth.

Figures 1, 4:
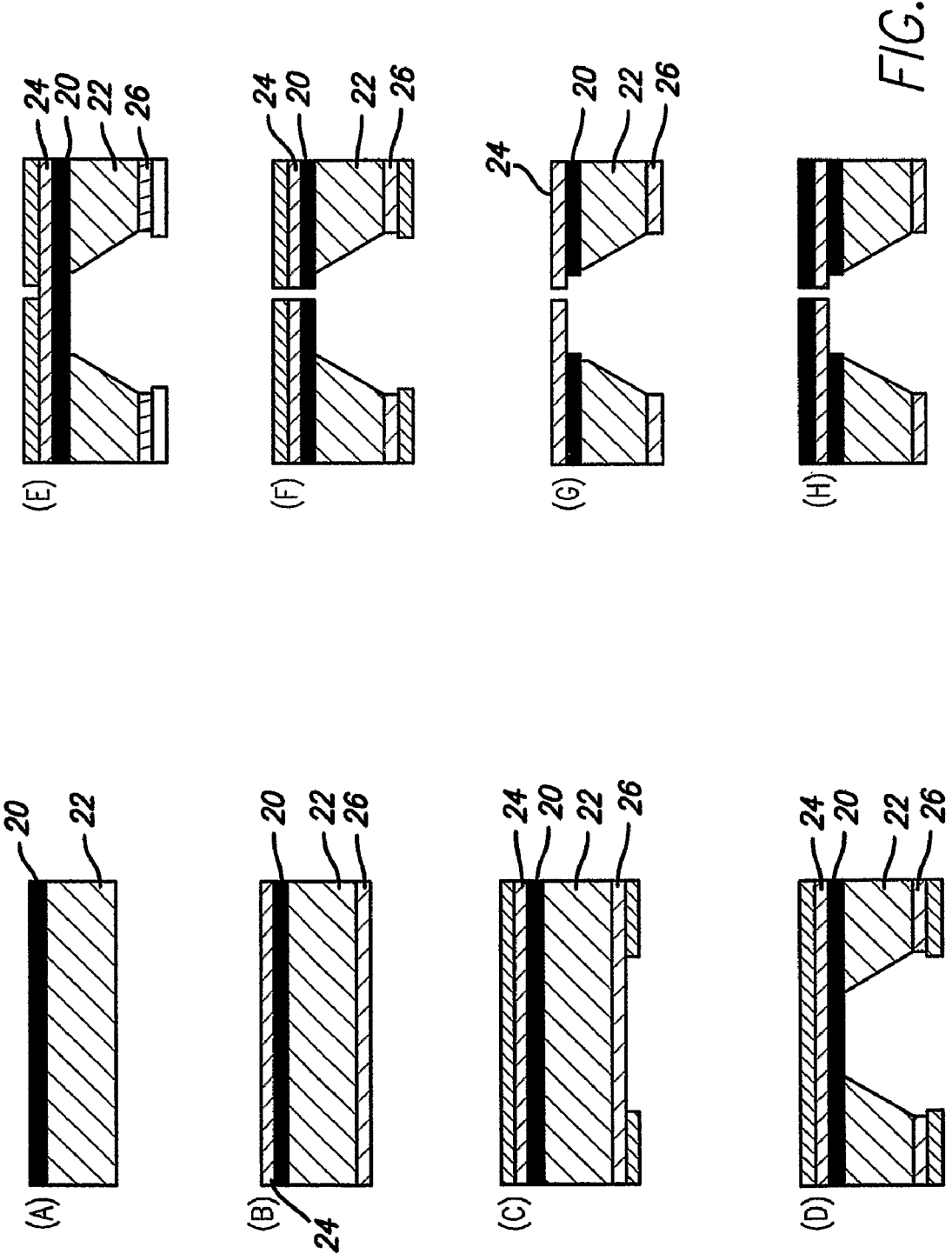
FIGS. 1(a)-(e) schematically illustrate a processing step of fabricating an inventive nanoprobe structure on a substrate or a cantilever structure.
FIGS. 4(a)-(l) schematically illustrate a processing step of fabricating a cantilever body structure with nanoprobe structure on it.

An aligned carbon nanocone array structure in a periodic spacing, according to the invention process of FIG. 1, with multiple carbon dots fabricated and used as etch masks, is shown in FIG. 2 as a scanning electron microscope (SEM) image. The nanocones are grown vertically aligned on the substrate with basically comparable diameter, cone shape and aspect ratio.

Figure 3:
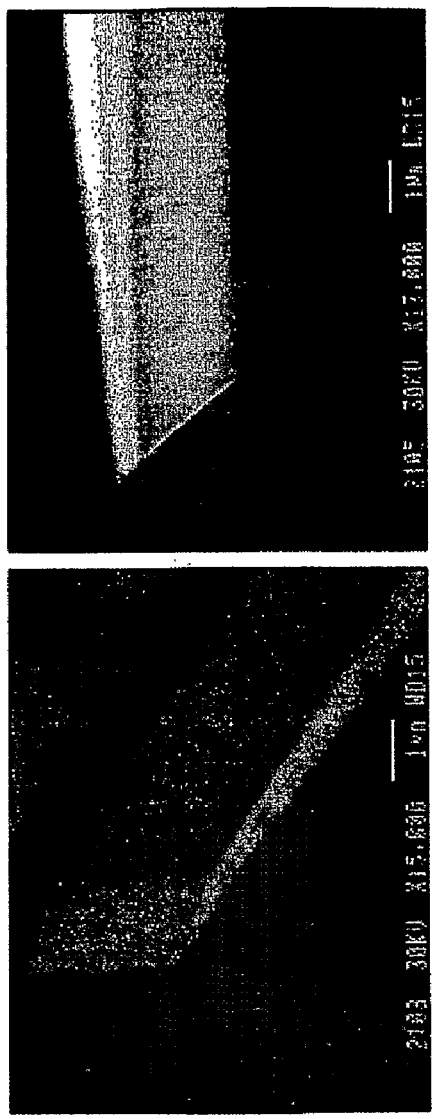
FIG. 3 represents SEM micrographs of a single carbon nanocone on the conventional cantilever obtained by EBID patterning of Ni catalyst followed by CVD growth.

Shown in FIG. 3 is an SEM (scanning electron microscopy) image depicting a single carbon nanotube probe grown on a tipless cantilever by the inventive method of FIG. 1. Tipless cantilevers (which are arbitrarily defined here as pyramid-less cantilevers) can be fabricated by standard lithographic silicon processing. Tipless cantilevers (NSC/Tipless no Al, from MikroMasch USA) were used here as an example to demonstrate the nano probe fabrication using inventive techniques. The cantilevers were first cleaned by ultrasonication in acetone, immersion in methanol and rinsed with D.I. water. The top surface of the cantilever was first coated with a catalyst metal film (~10 nm thick Ni film by electron beam evaporation) as illustrated in FIG. 1(a).

For the electron-beam-induced deposition (EBID) of carbon, a JEOL 845 scanning electron microscope (SEM) with the NPGS software (J. C. Nabity lithography system) was used. No special carbonaceous precursor molecules were introduced to the SEM chamber as the residual carbon-containing molecules naturally present in the chamber were sufficient for the needed EBID processing to form amorphous carbon islands on the Si sample surface. The carbon dot island with a selected diameter of 200 nm to 500 nm was deposited near the front end edge of the cantilever by EBID. The base pressure used was below $10^{-5}$ torr, and the accelerating potential used was 30 kV. The electron beam size in the SEM was approximately 5 nm in diameter, and the beam current was 50 pA. The deposition time was varied between 5 to 30 s depending on the desired size of the carbon dot.

The portion of the Ni film that was not masked by the carbon dot was then chemically etched away by using a mixture of $[H_3PO_4]$: $[HNO_3]$: $[CH_3COOH]$: $[H_2O]=1:1:1:2$. The processing parameters were adjusted to account for the undercut by lateral etching of the Ni island beneath the carbon dot mask. The chemical etch rate can of course be controlled by adjusting the ratio of acid vs $H_2O$. Different sized carbon dots were prepared for the wet etching process in order to compensate for the lateral chemical etching of Ni island.

The dry etching of carbon dots was performed with oxygen reactive ion etch (RIE) for 1 min, which exposed the Ni nano island. The Si tipless cantilever with the Ni nano island was then transferred to the DC plasma CVD system for subsequent nucleation and growth of carbon nanotube or nanofiber. The CVD growth of the carbon nanofiber probe tip was carried out at 700° C. for 10-20 min using a mixture of $NH_3$ and $C_2H_2$ gas (ratio 4:1) at 3 mtorr pressure. An applied electric field (at a bias voltage of 550V) was utilized to guide the growth of the nanofiber along the desired direction. The length of the CNF formed was about 2-3 μm.

The SEM image of FIG. 2 shows a single carbon nanocone grown on a tipless cantilever viewed from different angles. The single carbon nanocone was grown from the 300 nm carbon dot position. While the growth of a vertically configured carbon nanofiber probe is relatively easy by the electric field guided cvb, a slightly tilted AFM probe is often desirable to compensate for the tilt angle of the probe arm. In this inventions it has been demonstrated that the positioning of the carbon nanotube/nanofiber growth in the CVD system dictates the growth direction. The edge of a cantilever where the catalyst island was fabricated, is a protruding object. Utilizing this unique situation in the exemplary invention process, the field concentration effect of the protruding cantilever edge, which tends to bend the electric field toward the edge was used to induce a self-tilting electric field on the growing carbon nanocone. As a result, a tilted nanocone probe structure was created, as is evident from FIG. 3, with the probe tilt angle of ~15° with respect to the normal direction of the cantilever surface. Such a tilted probe is convenient as it can compensate the tilt angle of the probe arm so that the probe itself is close to vertical, for stable imaging of an object.

With reference to FIGS. 4(a)-(l), a preferred embodiment for large-scale fabrication of many cantilever structures with carbon nanotube or nanocone probe tips is described. FIGS. 4(a)-(g) depict a conventional Si based process for producing cantilever structures. A desirable material layer 20 for the cantilever beams (such as Si3N4) was deposited on a substrate 22 with an etch stop layer, or choosing a substrate including a cantilever beam layer (ex, silicon-on-insulator SOI wafer) as shown in FIG. 4(a). The etch mask layers 24, 26 were coated on both sides of substrate 22, see FIG. 4(b). The etch mask can be the material which has high etching selectivity to the cantilever material. As seen in FIG. 4(c), patterning the backside etch mask layer to define the outline of cantilever bodies and alignment marks was done by using photolithography. Backside etching can be done by KOH wet etching or Si deep RIE, as shown in FIG. 4(d).

As seen in FIG. 4(e), patterning the frontside etch mask layer to define the outline of cantilever beams and alignment marks was done by using photolithography. Frontside etching of the cantilever layer can be done by RIE or wet etching, as shown in FIG. 4(f). The etch mask layers and etch stop layer can be removed by wet etching or be dissolved in organic solutions, see FIG. 4(g). Following the procedures illustrated in FIGS. 4(h)-(l), the same as FIGS. 1(a)-(e), carbon nanotube or nanocone nanotips 30, 32, 34, and 36 can be grown on cantilevers. The invention process of FIG. 4 is compatible with a wafer scale production for silmutaneous fabrication of many nanotips. The carbon nanotube or nanocone probes can be fabricated by CVD on the wafer scale similarly as illustrated in FIG. 2, followed by dicing (cutting of the wafer into many cantilever pieces), or they can be fabricated after dicing of the cantilevers first (each cantilever containing one catalyst island) and placing them in the CVD chamber for carbon nanotube or nanocone probe growth.

In this invention, three embodiments of novel types of nanotube configurations are disclosed for solving the problems of prior art nanotube AFM tips and improving the performance of AFM.

(1) High Aspect-Ratio Nanocone-Shaped Nanotube AFM Tip

Figure 5:
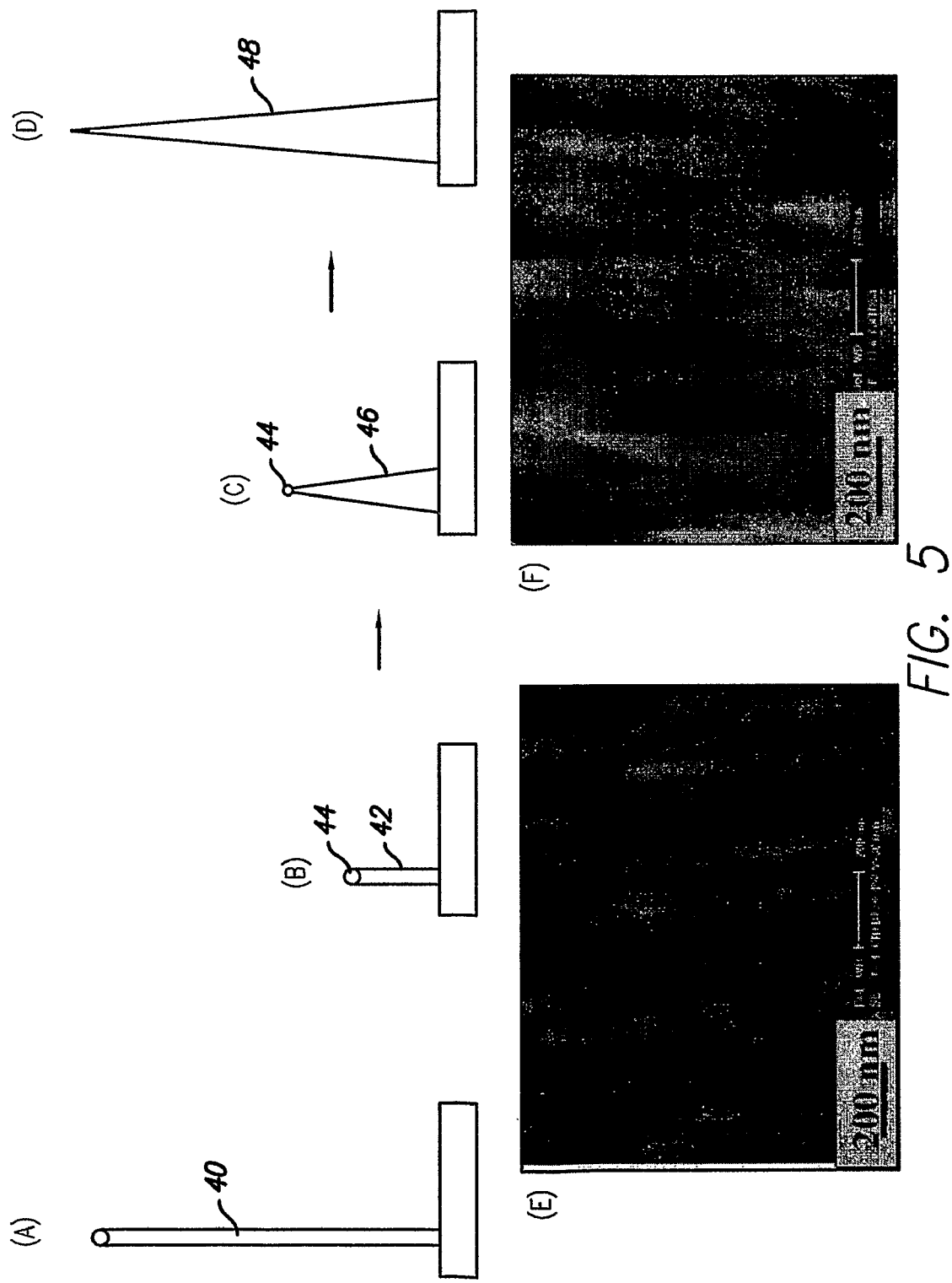
FIGS. 5(a)-(d) represent a schematic illustration of the nanotube tip shape change, and (e)-(f) represent SEM pictures of an aligned carbon nanotube structure and an aligned nanocone structure, respectively, corresponding to FIG. 5(a) and FIG. 5(d).

One way of improving the adhesion of the nanotube/nanofiber tip on the cantilever, according to the invention, is to make the nanotube tapered into a nanocone geometry, as illustrated in FIG. 5. The desirable configuration is to provide a very sharp tip for high resolution SPM imaging, e.g., the tip radius of curvature of at most 15 nm, preferably 5 nm or less, and even more preferably 2 nm or less. For the purpose of mechanical sturdiness of the nanotube probe, especially in the absence of AFM pyramid base structure, the cone structure needs to have a substantial base cone diameter. The desirable cone base diameter is at least 100 nm, preferably at least 300 nm, even more preferably 500 nm. To simultaneously provide a small-diameter, sharp tip for high resolution SPM analysis and mechanical stability with a large diameter cone base, a certain minimal high aspect ratio of the nanocone structure is desirable, according to the invention. For example, the ratio of the nanocone length/cone base diameter in this invention is at least 2, preferably at least 5, even more preferably at least 10. Such a high aspect ratio of nanocone probe tip is also beneficial in probing shallow crevices or narrow tracks.

A prior art nanotube structure 40 grown vertically aligned using a DC plasma CVD process is shown in FIG. 5(a) as a scanning electron microscope (SEM) image. The vertical alignment morphology of nanotubes such as shown in the figure is obtained, e.g., after growth by DC plasma CVD, using a mixed gas of acetylene and ammonia at ~700° C., at an applied voltage of ~450 volts or lower, at a cathode-anode gap of about 1 cm. These carbon nanotubes are multiwall nanotubes (MWNTs) having a diameter typically in the range of ~5-100 nm depending on how many walls (concentric cylinders) are present in the nanotube.

Shown in FIG. 5(b)-(d) is a sequence of microstructural changes utilized in the invention to create a desired nanocone structure. Such a vertically aligned nanocone structure instead of a vertically aligned nanotube, is obtained by identical DC plasma CVD processing as in FIG. 5(a) but at a higher applied voltage of ~500 volts or higher. Under such a sufficiently high applied voltage, the equi-diameter nanotube 42 grown at the early stage of the CVD process is gradually turned into a nanocone configuration as the catalyst nanoparticle 44 at the advancing tip of growing nahotube 46 gets gradually sputtered away and becomes gradually smaller, FIG. 5(c). Since the diameter of a growing nanotube is dictated by the diameter of the catalyst particle, a nanocone structure 48 is formed with the catalyst particle eventually completely sputtered away, FIG. 5(d). Examples of actual carbon nanotube and nanocone probes are shown in SEM micreographs of FIG. 5(e) and FIG. 5(f), respectively. The nanocones without the round catalyst particles are very sharp at the tip, with an estimated radius of curvature as small as a few nanometers. Such probe tips can thus provide much improved, higher lateral resolution in scanning probe operation.

The prior art type aligned nanotubes of FIG. 5(a) on the other hand have a finite and much larger diameter tip (e.g., 20-40 nm radius of curvature) because of the more or less spherical or sometimes blocky Ni catalyst nanoparticles present at the tip. Scanning probe tips such as AFM probes with such a round or blocky catalyst particles have a limited lateral resolution.

In this invention, the term "nanocone" is also called a "nanocone nanotube", as some of the nanocones are partially or wholly tube-like while other nanocones are mostly solid. The nanocones are made of carbon but contain some silicon (e.g., 2-50 wt %) depending on the CVD conditions. The silicon is incorporated into the nanocone by either the diffusion of Si from the substrate material or by sputter etching of Si from the substrate and its trapping in the nanocone, as carbon is added onto the nanocone. The growth of the nanocone is facilitated, according to the invention, by utilizing a higher applied voltage in the plasma CVD process so that the sputter erosion of Ni catalyst particle gradually occurs at the optimal rate during nanotube growth and induces a gradual decrease in catalyst capacity for carbon uptake, which results in a slow down of nanotube height increase. Simultaneous with the decreased rate of height increase, carbon and silicon are added onto the sidewall of the nanotubes, thus forming the nanocone geometry.

The use of cantilever geometry as a field concentrating base provides a unique and reproducible tilt angle for the carbon nanotube or nanocone relative to the tipless cantilever substrate surface even with a simple vertical electric field applied, according to the invention. The typical tilt angle obtainable by such a self-tilting mechanism is typically in the range of ~1 to 30 degrees, preferably 5-15 degrees. The tilt angle of the growing carbon nanotube or nanocone can be further increased, with the controllable tilt angle ranging from ~1 to close to ~90 degrees (almost horizontal angle) by placing the substrate in the inner corner of sharp cornered conductor blocks as disclosed by J. F. AuBuchon, et al, Nano Letters 4, 1781 (2004) and PCT application PCT/US05/25763 by Aubuchon, Chen and Jin, "Catalytically Grown Nano-bent Nanostructure and Method for Making the Same", filed Jul. 20, 2005. Using the inventive process of electron beam induced carbon dot mask in combination with the inner corner electric field control during CVD, the scanning probe tilt angle can be controlled at will, as illustrated schematically in FIGS. 7(c) and 7(d).

(2) Pedastal-Based, Taller Nanocone or Nanotube AFM Tip

For some AFM applications, such as probing of deep cavities or inside of holes, a taller AFM tip configuration is desired. While the carbon nanotube or nanocone defined by the inventive EBID process can be made taller by extended CVD growth time, the use of a height-raising pedestal underneath the carbon nanotube or nanocone probe is an alternative approach that can be utilized. This invention process and structure are schematically illustrated in FIG. 6.

In FIG. 6 (a), a height-raising pedestal 50 is added onto the AFM probe cantilever 52 by standard silicon fabrication and MEMS fabrication processes. The desired height of the pedestal is dependent on the need for probing of a deep cavity or holes, but is typically in the range of 1-200 micrometers. A catalyst layer 54 coating (e.g. Ni, Co, Fe, Pd, or their alloys), typically 2-200- nm thick, is then added by sputtering, evaporation, electroplating, CVD and other methods (FIG. 6(b). Then the EBID process is applied to deposit a single carbon mask island 56 (or multiple islands if multiple probes are desired), which is also illustrated in FIG. 6(b). The catalyst layer is then etched away, e.g., using an acidic solution, except the carbon-masked island region, FIG. 6(c). Subsequently, the CVD growth of a carbon nanotube or nanocone 58 is carried out, preferably in the presence of an electric field, for example, with an applied voltage of 300-600 volts per cathode-anode gap of 1 cm, as illustrated in FIG. 6 (d).

(3) Bent Nanotube AFM Tip

Figure 7:
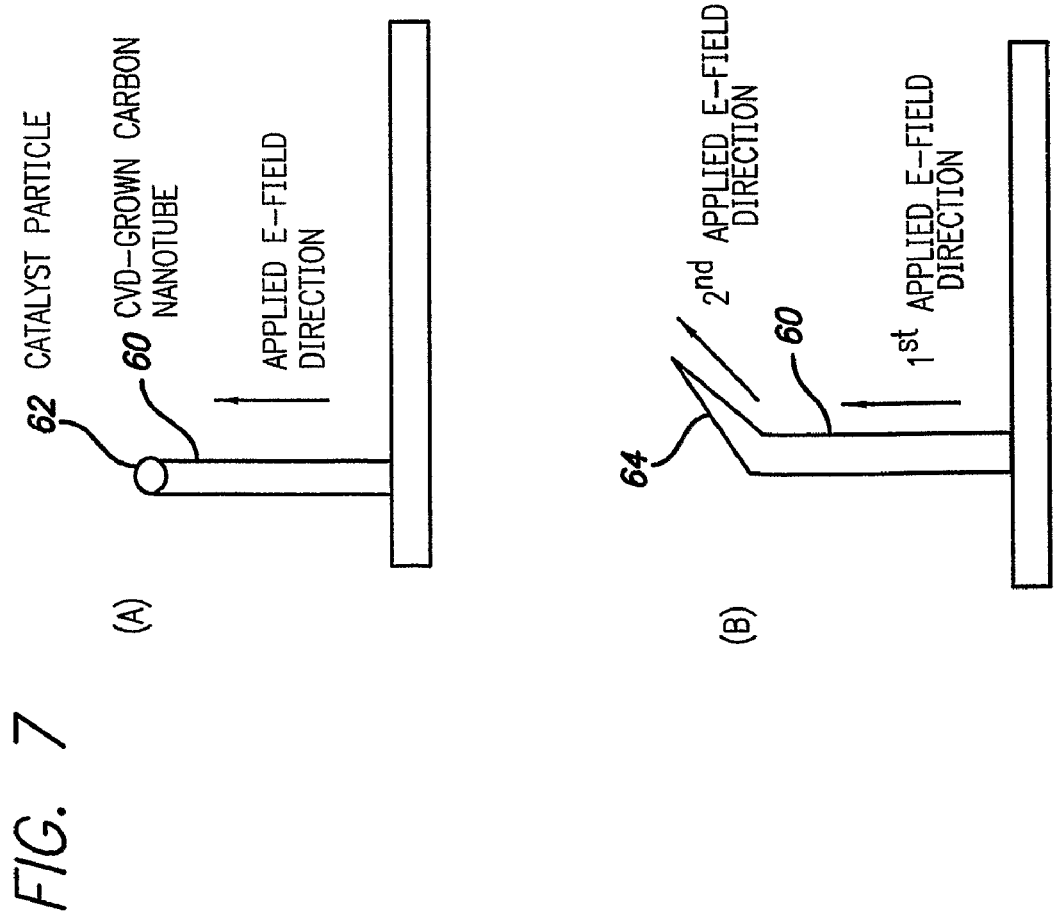
FIGS. 7(a)-(b) schematically illustrate processing steps of obtaining a bent nanotip structure according to the invention.
FIGS. 7(c)-(d) schematically illustrate configurations of electric-field aligned nanocone tips, according to the invention.
FIG. 7(e) illustrates one of the preferred configurations of electric-field bent nanocone tips placed on a pedestal raised base, according to the invention.

A bent carbon nanotube can be used as an AFM tip for sidewall images. Such a tip structure is illustrated in FIG. 7. The carbon nanotube 60, fabricated using an EBID-defined catalyst island 62 is allowed to grow vertically to a desired height (FIG. 7 (a)), then the growth is interrupted so as to alter the applied electric field orientation and abruptly change the nanotube growth direction. Onto the tip of this first-leg nanotube, which serves as the height-raising base, another nanotube or nanocone 64 (a second-leg nanotube or nanocone) is nucleated and grown as illustrated in FIG. 7(b). Instead of a nanotube base, a nanocone base, with vertically straight (FIG. 7(c)) or tilted (FIG. 7(d)) configuration 68 can be utilized, as this provides more mechanical stability of the base. For example, the configuration of 7(d) can be utilized as the base for another bend added at the tip. The bent probe structures in FIG. 7(b) can also be placed on a pedestal raised base 69, with either the catalyst particle left at the bent probe tip or removed, as shown in FIG. 7(e).

Figure 8:
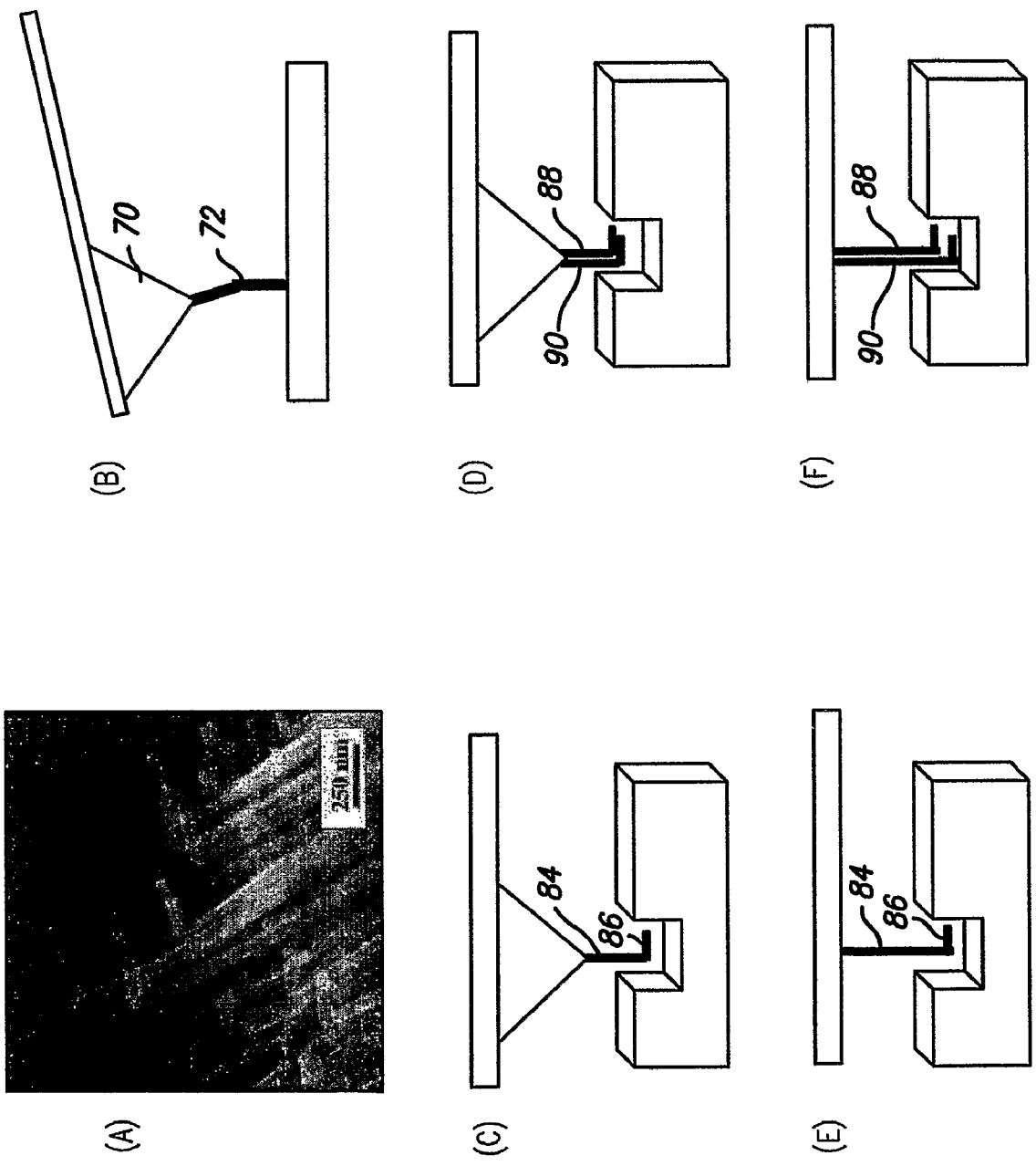
FIGS. 8(a)-(f) show a bent nanotube based probe system, (a) SEM micrograph showing 90 degree bent nanotubes obtained by electric field manipulation, (b) slightly bent nanotube probe, (c) 90 degree bent nanotube probe for sidewall probing for metrology, (d) two-probe type sidewall conductivity probing system, according to the invention.

Shown in FIG. 8(a) are exemplary bent nanotubes, in this case, ~90 degree sharply bent structure prepared by using the electric field control. Bent nanotubes can be grown on a flat substrate or on a protruding base structure such as the apex of AFM pyramid 70 as illustrated in FIG. 8(b), Which conveniently compensates the tilted angle of the probe arm 72. Illustrated in FIG. 8(c) is a scanning probe 84 with sharp bend angle 86, according to the invention. Such a near 90 degree, sharply-bent nanotube or nanocone probe allows convenient probing of a sidewall, even inside relatively deep and narrow cavities. Metrology of topographical features, surface hardness, as well as magnetic force microscopy analysis can be carried out using such a sharply bent probe.

If desired, two side-by-side probes 88, 90 can be fabricated, as illustrated in FIG. 8(d), by using two EBID-induced carbon dot masks and resultant two catalyst islands, followed by CVD growth of electric field guided nanotubes or nanocones. Such a dual probe system can be useful for a variety of multifunctional characterization of material surface, for example, to measure local electrical conductivity, such as that of a second phase material. FIGS. 8(e) and (f) show the single or dual sharply bent nanotube or nanocone probes on a tipless cantilever. An even higher number of nano probes (e.g., 3-20) can be fabricated on the same cantilever (either a tipless or a pyramid-containing cantilever), if desired, in order to carry out multifunctional measurements. These multiple probes can be either straight, or tilted or sharply bent depending on specific needs.

The fact that the nanotubes or nanocones are elastically compliant and can hence make multiple contacts on the sample surface is an especially important advantage for such multi-probe measurements. The traditional probes such as based on Si does not allow much elastic bending and hence making reliable contacts onto two spots on the sample surface is practically impossible.

Figure 9:
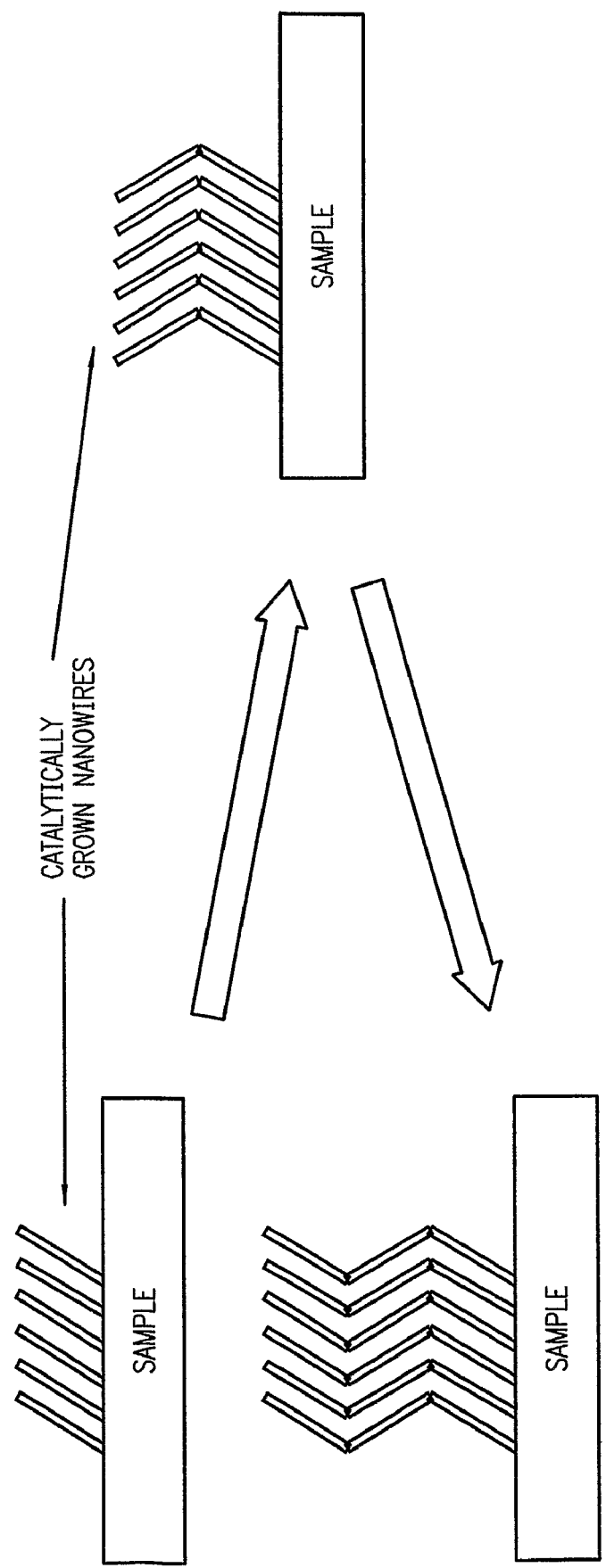
FIG. 9 illustrates the sequence of electric-field-guided bending of a nanotip probe.
Figure 10:
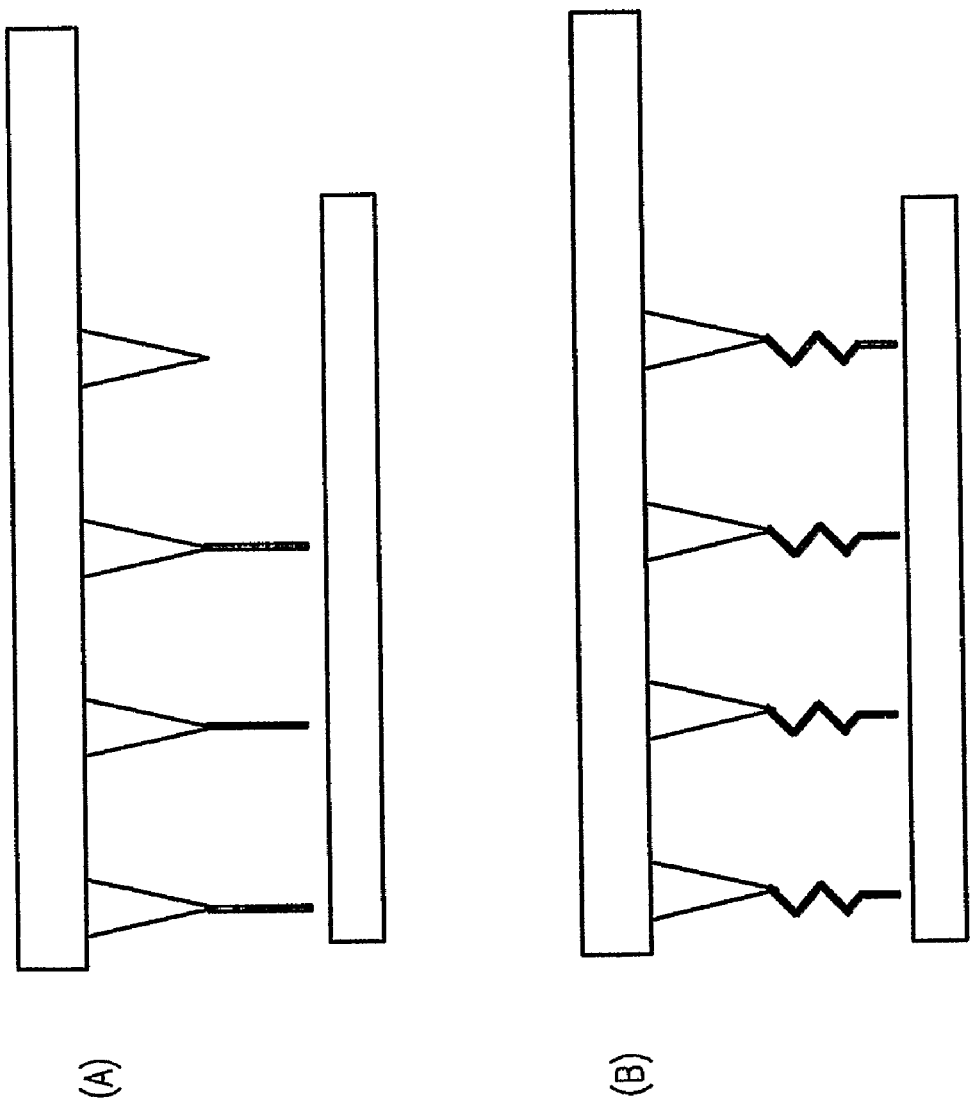
FIGS. 10(a)-(b) schematically illustrate (a) an array of straight nanotube or nanocone probes fabricated on the AFM pyramid by using the inventive process, (b) an array of zig-zag bent nanotube or nanocone probes according to the invention.

The bending of the nanotube or nanocone probe can be repeated a multiple times to create a zig-zag shaped probes, for example, to impart more elastic compliance if needed. The process of zig-zag probe fabrication is schematically illustrated in FIG. 9. An example probe system comprising an array of such zig-zag probes is shown in FIG. 10 (a) and (b). Other shapes such as box-helix shaped probes, FIG. 11 (a) or coil-shaped probes, FIG. 11 (b) can also be fabricated using electric field guided growth of a carbon nanotube or nanocone based on EBID of carbon dot masks, as illustrated in FIG. 11.

(4) Two-Stage Hierarchical Nanotube AFM Tip

Yet another embodiment of EBID-defined nanotube or nanocone based AFM probe geometry is based on a two-stage, vertically hierarchical, nanotube configuration which uses the nanocone as the basis but using a smaller diameter nanotube or nanocone as the secondary, sharper leg of the probe structure. The design and fabrication approaches for such a hierarchical nanotube-based probe structure are described below.

Figure 12:
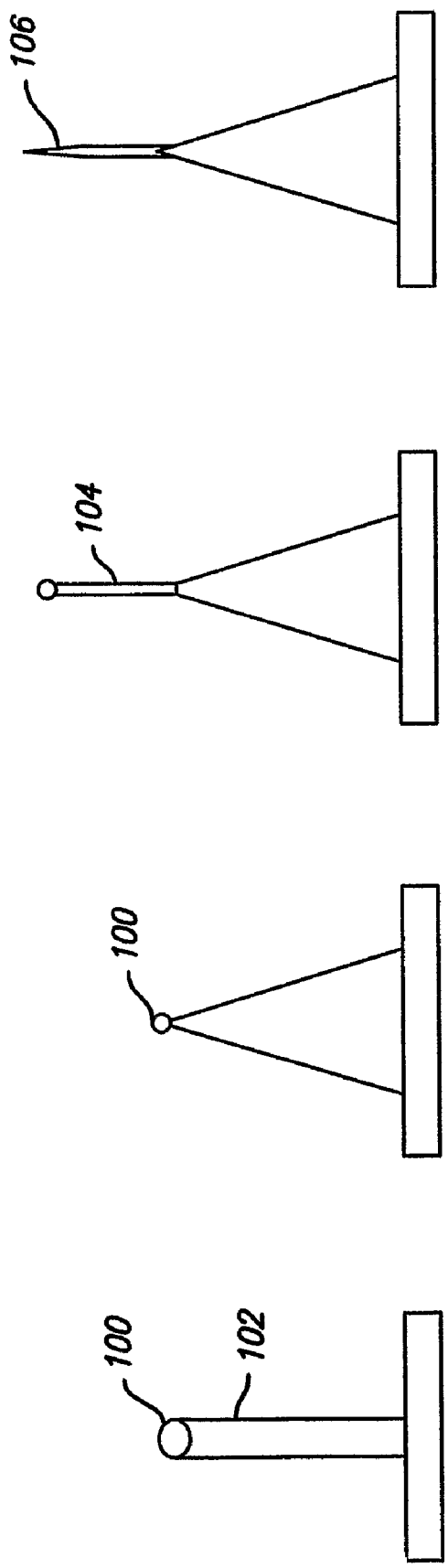
FIGS. 12(a)-(d) represent schematic drawings showing the two-step growth processing process of obtaining the inventive vertically hierarchical nanotip structure.

As discussed above, the geometry of the carbon nanotubes depends much on specifics of CVD processing. For example, a higher electric field applied during DC plasma CVD processing tends to induce more cone-like nanotube morphology of FIG. 12(b) as compared to the straight, wire-like nanotube structure of FIG. 12(a). The alteration of source hydrocarbon gas composition (toward acetylene-rich chemistry) also helps to induce more nanocone structure. TEM analysis of the carbon nanocone structure indicates that a significant amount of Si became incorporated into the cone structure, implying a possibility of Si diffusion or sputter despsition from the substrate.

While the nanotubes or nanocones continue to grow during the CVD process, it is observed that the presence of DC plasma also causes continuous sputtering erosion of the catalyst particles at the nanotube, gradually making the particle size smaller. The Ni catalyst particles 100 at the nanotube tip 102 of FIG. 12(a) are typically ~30 nm in diameter. On continued CVD, the particle size gets reduced to a much smaller size, e.g., ~7-10 nm as illustrated in FIG. 12(b). Such a gradually decreasing catalyst size is believed to be partially responsible for the nanocone formation as the kinetics of carbon uptake at the nanotube tip would become that much slower. By intentionally lowering the applied electric field at this stage, and continuing on with CVD, we were able to start growing straight nanotubes.

The reduced size catalyst particles of FIG. 12(b) thus produced straight and vertically aligned CNT 104 on top of the nanocone, with a much reduced diameter of ~7-10 nm as shown in FIG. 12(c). The two-step CVD process can be utilized so that an even further reduced diameter nanotube of e.g., ~1-3 nm diameter, can be synthesized on top of the nanocone. Such a probe configuration with a smaller diameter and flexible CNT on top of a mechanical stable cone base structure is highly desirable for enhanced reliability of high resolution AFM probe, especially with an assurance of only one nanotube on the tip, in a desirably straight and vertical geometry. An even sharper probe tip can be obtained by returning to a higher applied voltage during the last stage of CVD to sputter away the remaining catalyst particle and induce nanocone formation thus making the end 106 sharply pointed, as illustrated in FIG. 12(d).

Figure 13:
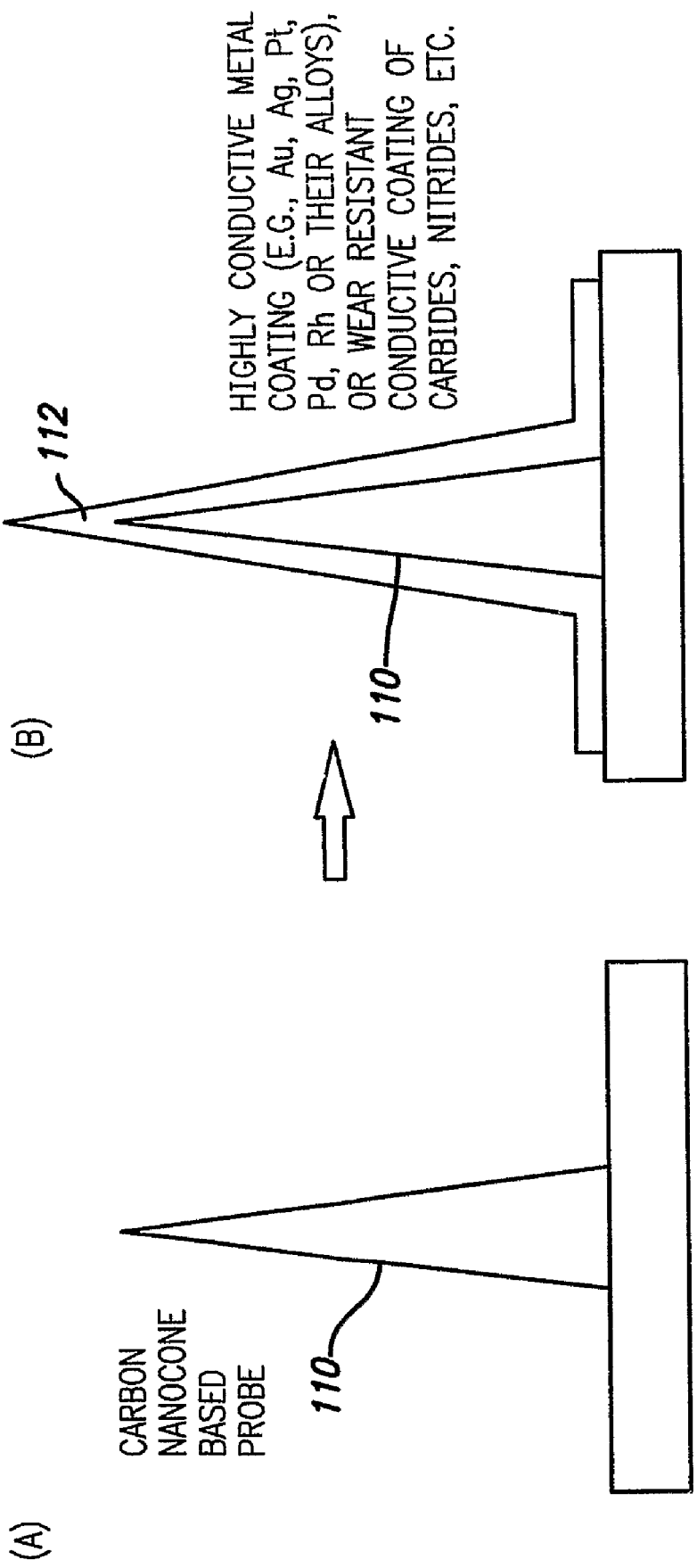
FIGS. 13(a)-(b) schematically illustrate a nanotube based probe system with a surface coating of highly conductive metal or alloy according to the invention.

Another embodiment of the invention related to a nanocone SPM probe, is to make it more suitable for an advanced, multi-functional probe system, instead of just a higher-resolution metrology AFM for topological imaging. For example, sharp conductance measurement probes can also be fabricated from the carbon nanocone structure, by coating the single 110 or an array of nanocones (or nanotubes) with highly conductive material 112 such as Au, Ag, Pt, Pd, Rh, Ru or alloys containing one or more of these metals. This is schematically illustrated in FIG. 13. As the carbon nanotube or nanocone probes of this invention are mechanically compliant, unlike the standard Si pyramid AFM probes, two point contacts or multipoint measurements (for example, four-point measurements of electrical resistivity) can be carried out more reliably. Since noble metals tend not to exhibit good adhesion on other metallic, ceramic or carbon based surfaces, an adhesion-ehnancing layer such as Ti or Cr may optionally be added prior to the deposition of the highly conductive layer. After deposition of the coating, an annealing treatment may be added if desired to induce stress relief.

Instead of metallic coating, a mechanically harder yet electrically conductive compound coating can also be used for probe applications where a wear resistance is especially desired. Suitable conductive coating materials for such wear resistant conductance probes include conductive carbides or conductive nitrides such as refractory metal carbides and nitrides (e.g., HfC, TaC, WC, ZrC, NbC, MoC, TiC, VC, $Cr_3C_2$ and their variations in stoichiometry, and HfN, TaN, WN, ZrN, NbN, MoN, TiN, VN, CrN), as well as some rare earth carbides and nitrides (e.g., cerium nitride). Intermetallic compounds are also mechanically strong and wear resistant. Such a conductive coating also coats the substrate surface to make it highly conductive. The coating can be done on selective areas by patterning with an electrically insulating photoresist pattern or oxide coating. Alternatively, the coating can be applied only on selective areas or lines by depositing the conductive layer through apertures in a shadow mask.

Figure 14:
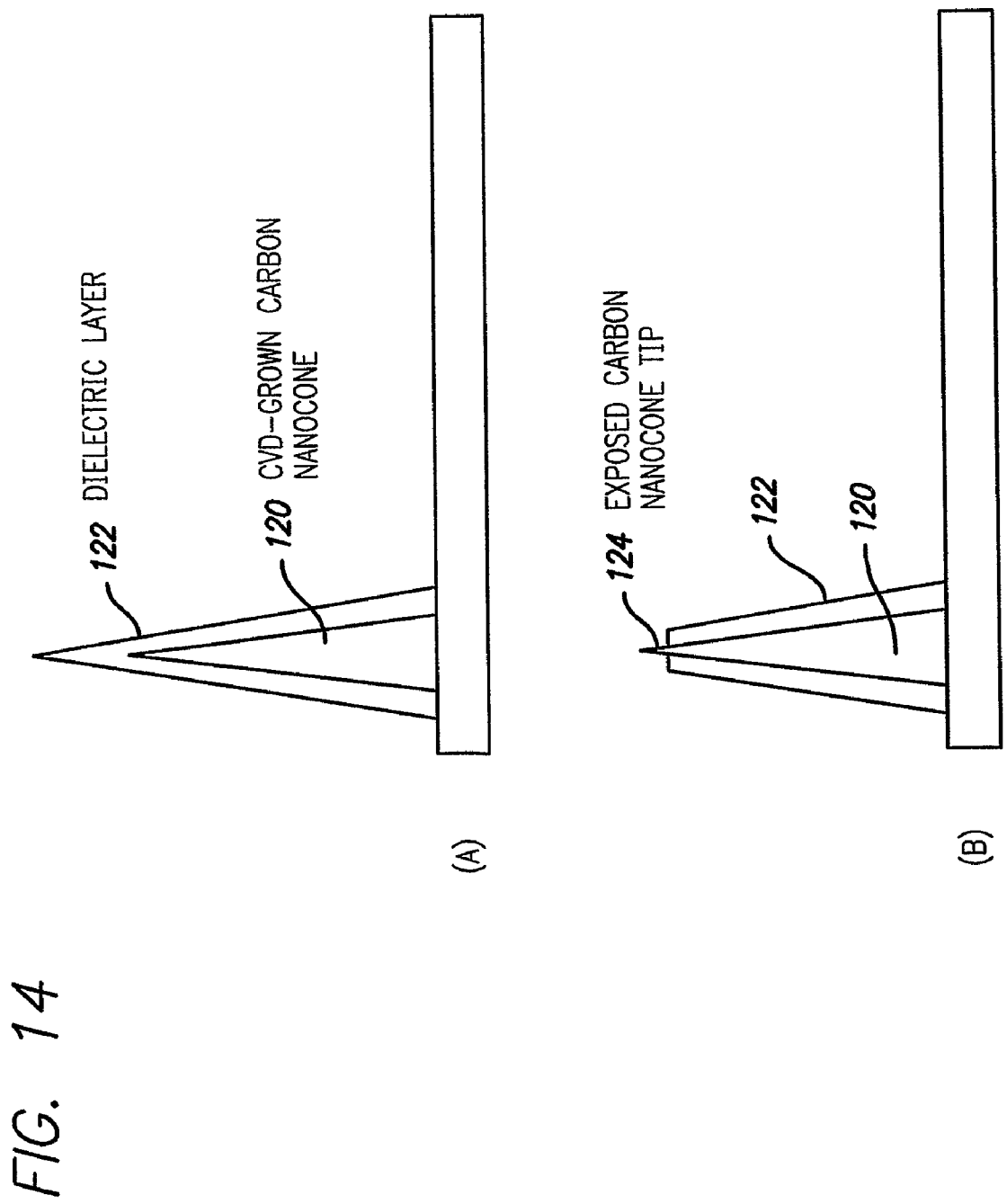
FIGS. 14(a)-(b) schematically illustrates a nanotube based probe system coated with a dielectric layer with exposed tip for conductance measurement in biological or fluid environment.

For electrical conductance measurements involving liquid medium, for example, bio-conductance measurements or ionic conductance measurements near the ion channels of living or simulated cell membranes, the sidewall of the nanoprobes needs to be coated with an electrical insulator (dielectric material) so that the measurement current does not diverge or leak in the fluid environment of a biological sample, and most of the electrical current or ionic current is measured through the sharp tip. An embodiment for such improved conductance probes made of carbon nanocone or nanotube 120 is schematically illustrated in FIG. 14. A suitable dielectric layer coating material includes oxides such as silicon dioxide or aluminum oxide, nitrides such as silicon nitride, or polymer materials. The coating 122 can be applied by physical vapor deposition (such as sputtering, evaporation), chemical vapor deposition, electroless or electroplating deposition. The tip 124 can be opened by annealing heat treatment which tends to retract the coating and expose the tip, or by selective chemical or electrochemical etching the reaction of which tends to concentrate at a sharp tip, or selective reactive ion etch, plasma etch, or laser beam ablation.

Figure 15:
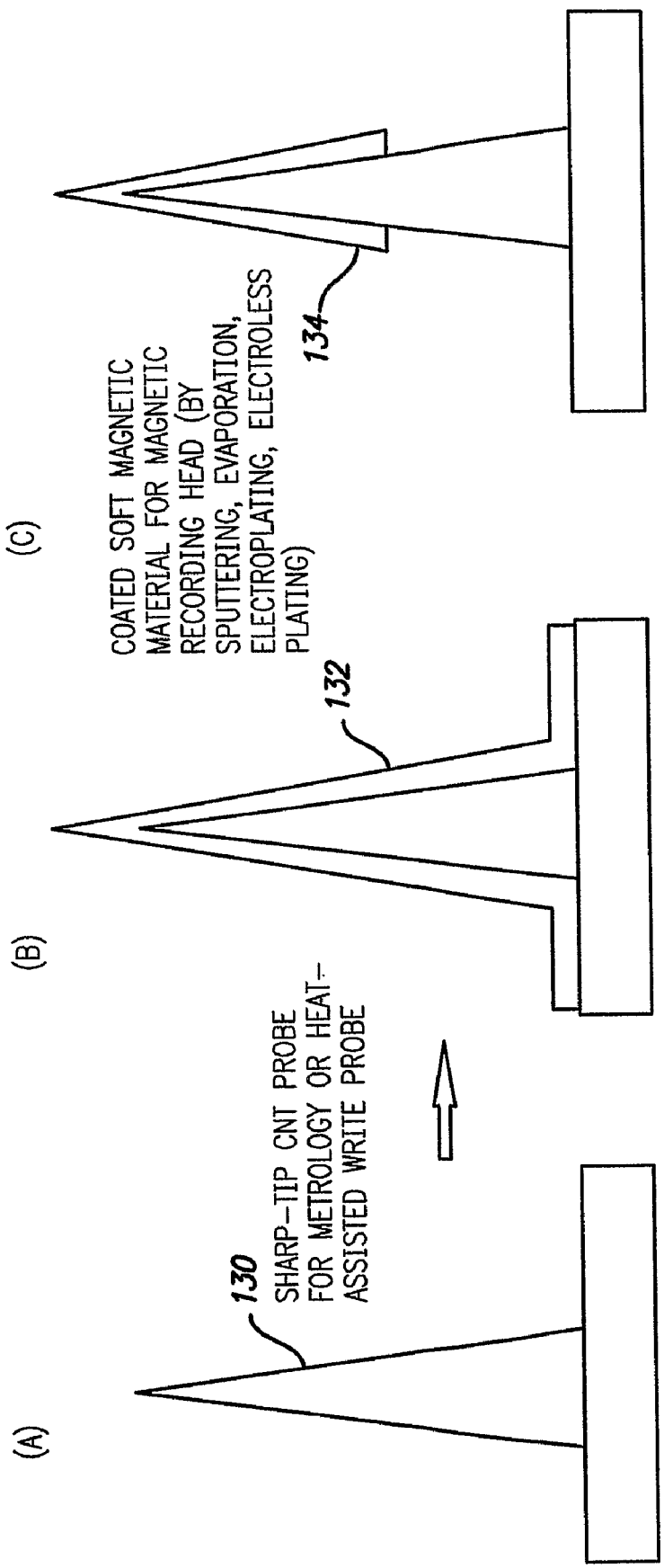
FIGS. 15(a)-(c) schematically illustrate a nanotip based probe system with a surface coating of a soft magnetic metal or alloy according to the invention.

Yet another embodiment of the invention includes a magnetic probe or magnetic writer. With a suitable coating with soft magnetic materials, the nanocones are made into magnetic recording write probes 130 or magnetic detectors as illustrated in FIG. 15. Examples of soft magnetic coating materials include Ni—Fe permalloys, Fe—Si alloys, Fe—Si—Al sendust soft magnetic alloys, amorphous soft magnetic alloys, soft ferrite such as Ni—Zn ferrites, nanocrystalline soft magnetic alloys such as Fe—Ta—N or Fe—Zr—N based alloy. These materials exhibit desirable soft magnetic properties with coercivity values of less than ~100 Oe, preferably less than 10 Oe. Known deposition techniques such as physical vapor deposition like sputtering, ion beam deposition, evaporation, chemical vapor deposition, electrodeposition or electroless deposition can be used. An adhesion-ehnancing layer such as Ti or Cr may be added if desired prior to the deposition of the magnetic layer. After deposition of the coating, an annealing heat treatment can optionally be given to reduce defects and residual stresses for improved soft magnetic properties. The soft magnetic coating 132 can cover all or a part of the substrate surface as well as illustrated in FIG. 15(b), or cover only the probe tip 134 as illustrated in FIG. 15(c).

Figure 16:
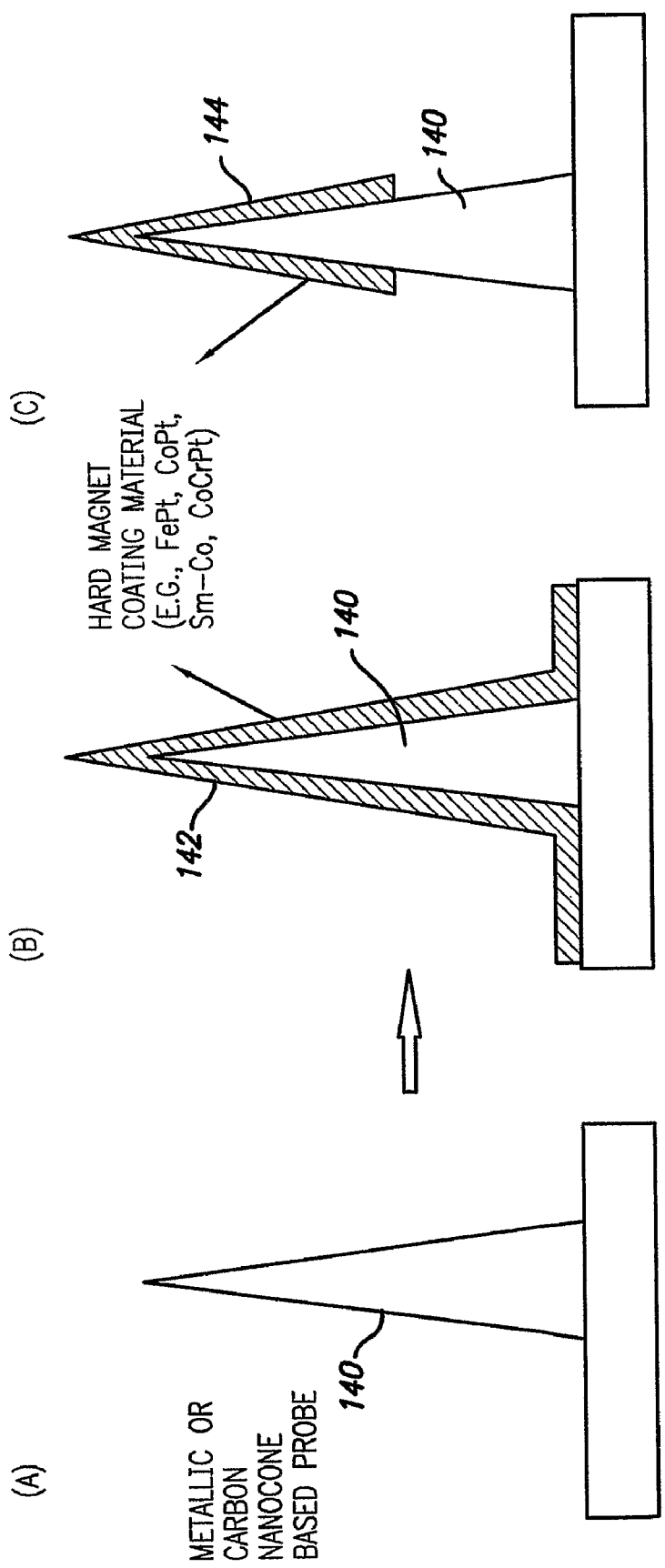
FIGS. 16(a)-(c) schematically illustrate a nanotip based probe system with a surface coating of a hard magnetic metal or alloy according to the invention.

Alternatively, a hard magnetic coating (with an optional annealing treatment) can be applied to fabricate MFM (magnetic force microscope) probe tips 140 as illustrated in FIG. 16. Desirable coating materials include high coercivity materials with the coercivity values of at least 1000 Oe, preferably at least 5000 Oe. The hard magnetic materials can be selected from, e.g., FePt, CoPt, CoPd, CoPdPt, Sm—Co alloys, Nd—Fe—B alloys, CoCrPt magnet alloys, etc. The permanent magnet coating 142 can also cover the substrate surface as illustrated in FIG. 16(b), or only the probe tip 144, as illustrated in FIG. 16(c). Similarly as in the case of soft magnetic coating, an adhesion-ehnancing layer such as Ti or Cr may be added if desired prior to the deposition of the hard magnetic layer. After deposition of the coating, an annealing heat treatment can optionally be given to reduce defects and residual stresses for improved permanent magnetic properties.

Instead of coating of hard magnetic layer on the nanocone surface, the catalyst particle itself for CVD growth of carbon nanotubes and nanocones can be selected to be ferromagnetic, high coercivity material, according to the invention, for example, FePt, CoPt, CoPd, CoPdPt, Sm—Co alloys, Nd—Fe—B alloys, CoCrPt alloys. A single or an array of such catalyst particle(s) can be prepared either by breaking up and spheroidization of a continuous thin film into catalyst islands during the initial stage of high temperature CVD process, or can be produced by lithographic process such as e-beam lithography, carbon dot mask deposition by EBID, or other patterning techniques such as extreme UV nanolithography.

Figure 17:
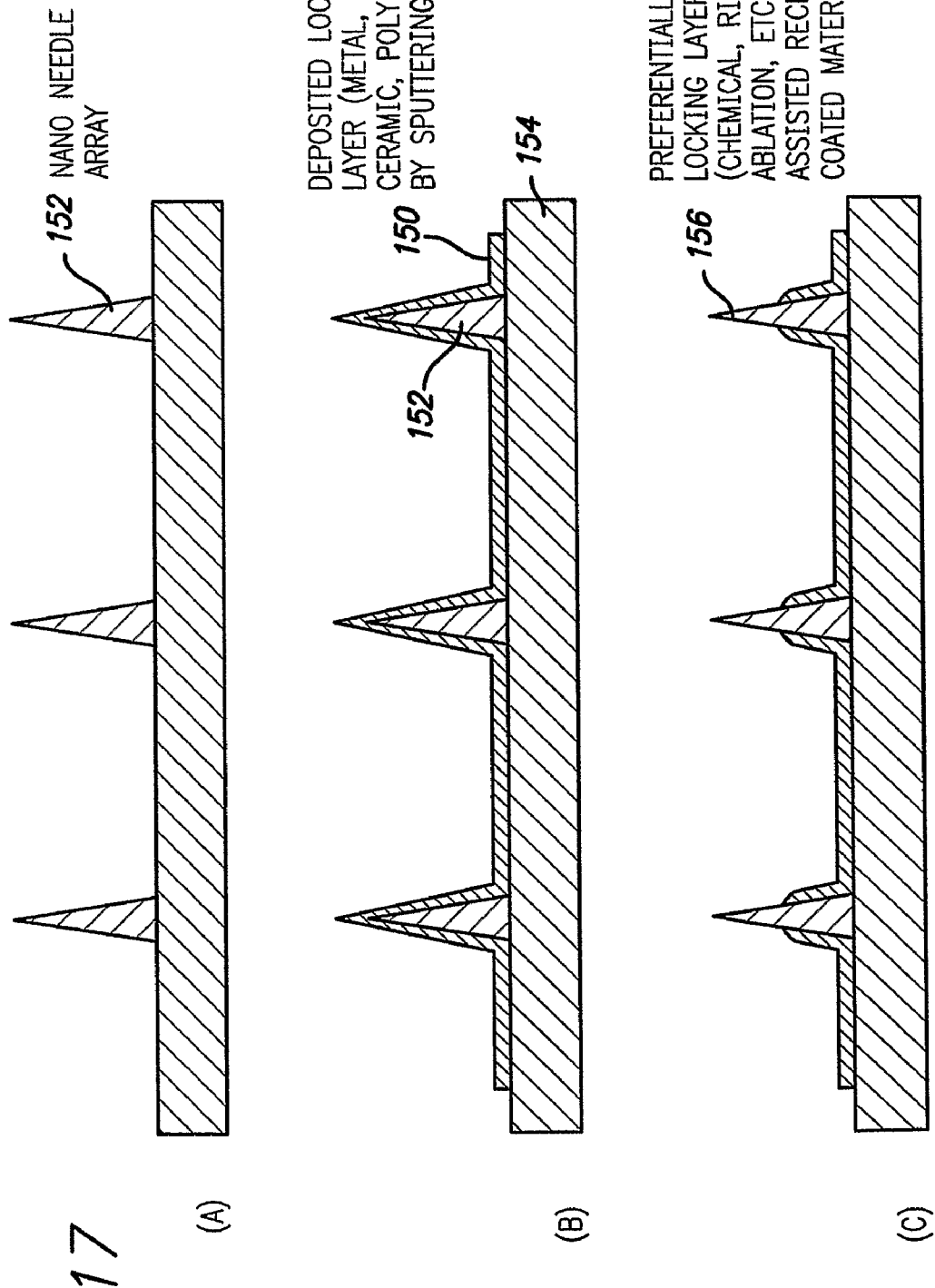
FIGS. 17(a)-(c) show a nanotip based probe system with an adhesion-improving layer added according to the invention.

The adhesion of the probe itself onto the substrate or cantilever is important for reliability of probe performance and for long term durability. The adhesion can further be improved, according to the invention, by coating with a mechanically locking layer of metal, ceramic or polymer. As illustrated in FIG. 17(a)-(c), the deposited layer 150 adheres to the nanoprobe surface 152 as well as onto the substrate surface 154. To expose the sharp probe tip 156 and remove or retract the coating material, various processing technique can be applied, such as chemical etching, electrochemical etching, reactive ion etching, plasma etching, or laser beam etching can be utilized.

As discussed earlier, the resolution of the nanoprobe system depends on the sharpness of the probe tip. In order to further enhance the sharpness of the carbon nanocone probe tips, especially those with conductive or magnetic coating layer as illustrated in FIG. 13, 15, and 16, the invention calls for an optional use of electron field emission to sharpen the tip of the nanoprobes. The very concentrated electric field near the tip of the field emitting needle tends to cause undesirable tip sharpening by diffusional mass movement due to electric field applied field and high temperature caused by intense field emission current, which eventually causes catastrophic failures in metallic tips such as molybdenum or tungsten tips, e.g., as in the case of well known Spindt emitters. Such a runaway distructuve process is always avoided in practice, however, in this invention, it is positively employed for the purpose of intentional tip sharpening.

Figure 18:
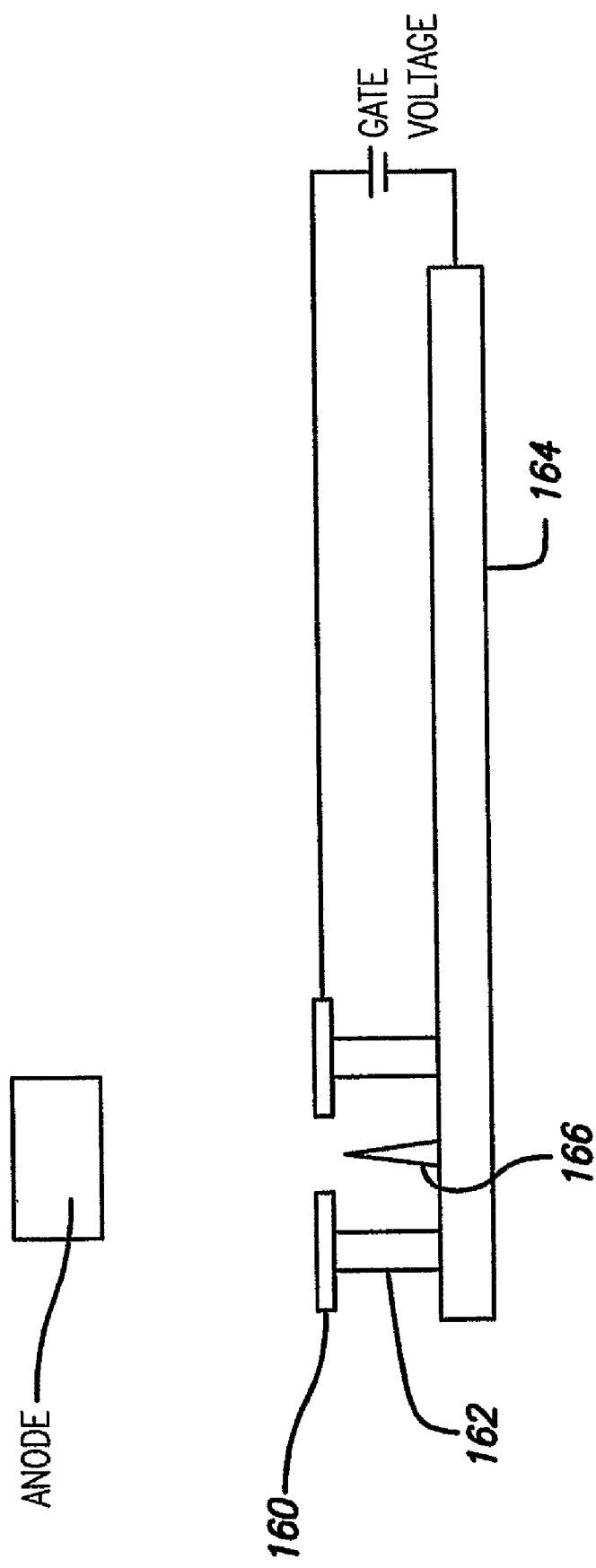
FIG. 18 schematically illustrates an inventive process of tip-sharpening of carbon nanotube or nanocone probes by using electron field emission.

According to the invention, a triode field emitter structure is constructed as illustrated in FIG. 18. A gated triode structure 160 such as using 100-500 nm thick Cr or W as the gate aperture, a dielectric spacer 162 such as 200-2000 nm thick Si oxide or Si nitride), is built on substrate 164, such as Si, with a metallic coated emitter (e.g., Pt or gold conductor coated carbon nanocone structure of FIG. 13 or Fe—Pt magnet alloy coated nanocone structure of FIG. 16), fabricated by deposition through as discussed earlier. A high current field emission causes the inventive metal tip 166, such as a Pt coated tip portion of the probe to be sharpened. The desirable tip sharpness is in the range of 0.1-20 nm, preferentially 0.5-5 nm. After the tip sharpening, the gate structure can be removed for exposure of the probe by utilizing chemical etching, ion beam etching or mechanical means, especially if the gate structure is in a pre-assembled drop-in configuration.

Figure 19:
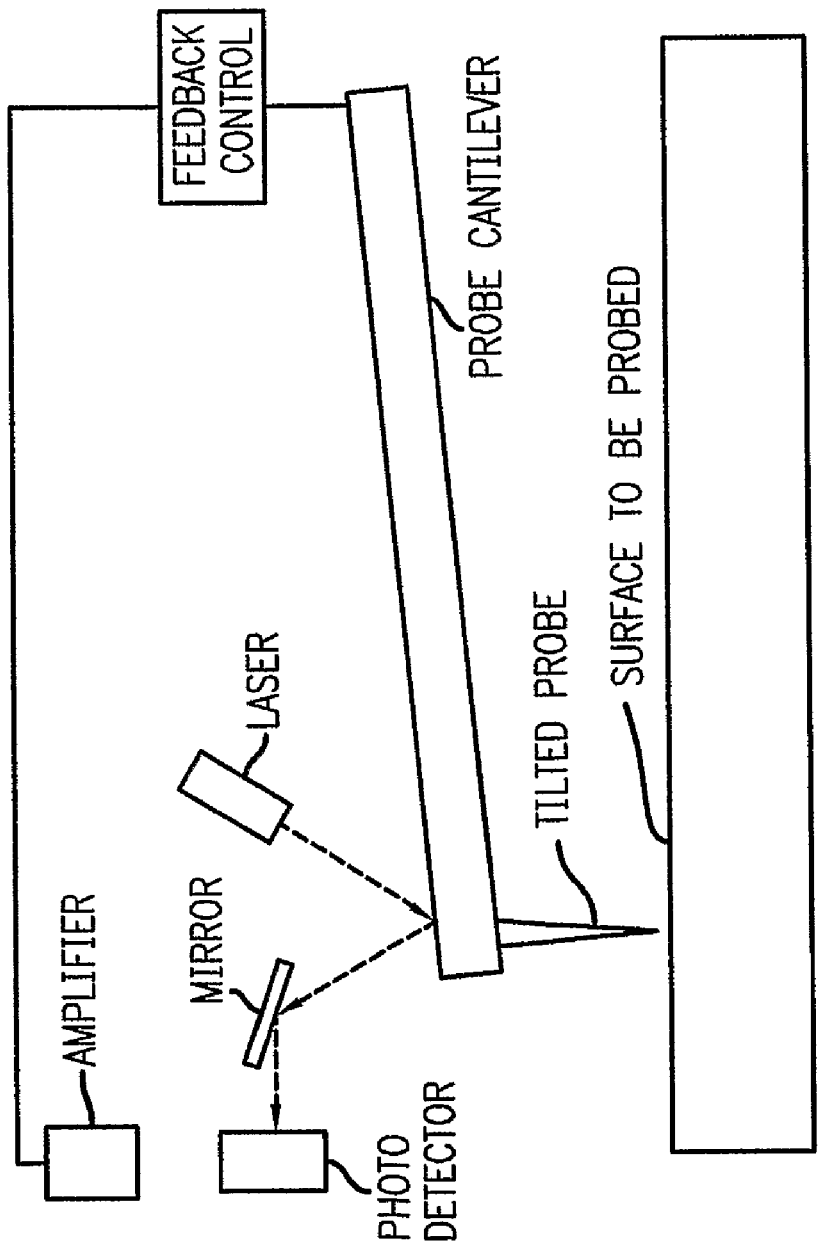
FIG. 19 schematically illustrates an exemplary inventive device system of laser controlled, AFM probe, MFM probe, Mechanical Tester Probe, Nano-indent Mechanical Tester, Conductance Probe, Heat-Assisted Write Probe, or Magnetic Recording Probe comprising inventive nanotube or nanocone probe tip (vertical, tilted or curved relative to the probe cantilever).

Referring to FIG. 19, the drawing schematically illustrates an exemplary inventive device system of AFM probe, MFM probe, Mechanical Tester Probe, Nano-indent Mechanical Tester, Conductance Probe, Heat-Assisted Write Probe, or Magnetic Recording Probe which comprises the inventive nanoprobe tips described in FIG. 1 through FIG. 18. The laser beam controls the positioning and feedback control of the nanoprobe in the inventive system. The EBID-fabricated nanoprobe tips in FIG. 19 can be positioned vertically, tilted or curved relative to the probe cantilever surface.

Figure 20:
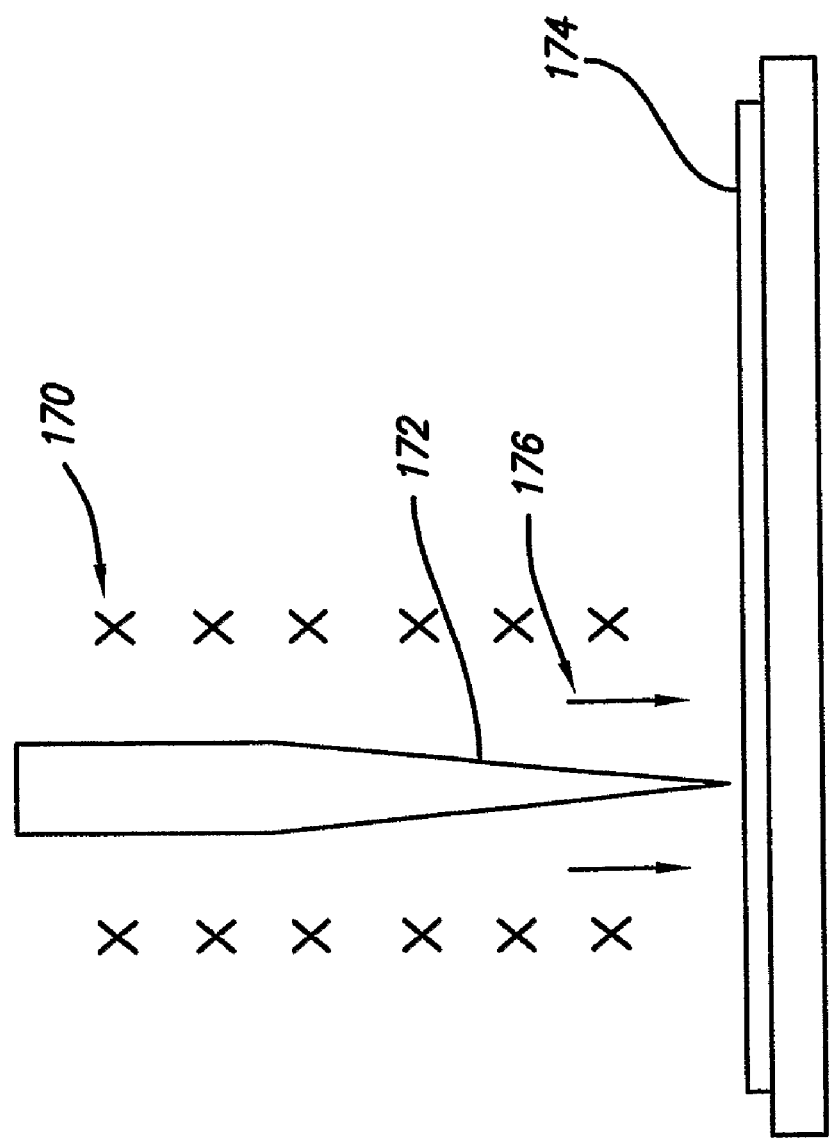
FIG. 20 schematically illustrates an exemplary inventive magnetic write-head or read-head based on carbon nanotube or nanocone probes with magnetizing field supplied from a solenoid, according to the invention.
Figure 21:
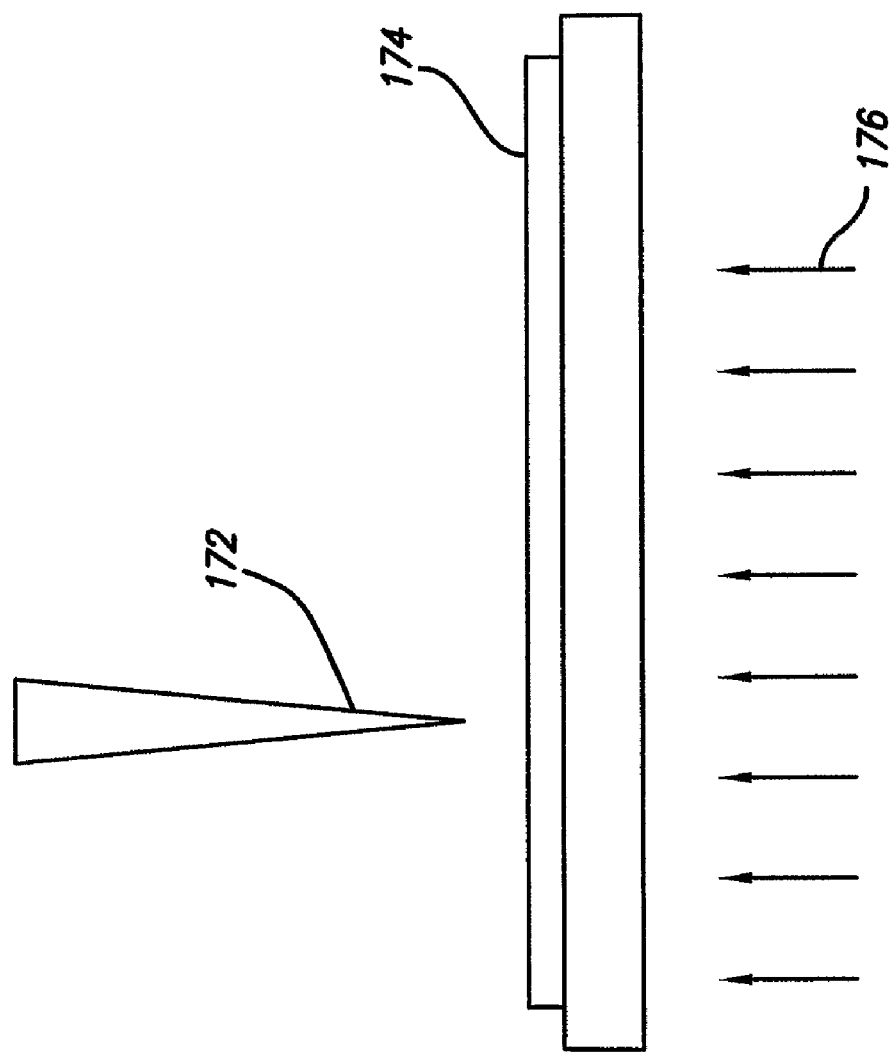
FIG. 21 schematically illustrates an exemplary inventive magnetic write-head or read-head based on carbon nanotube or nanocone probes with a blanket magnetizing field supplied from underneath, according to the invention.

Shown in FIG. 20 and FIG. 21 are exemplary, inventive, ultra-high-density magnetic read/write heads based on nanoprobes described in FIG. 15. In FIG. 20, an electromagnet 170, such as a solenoid containing a soft-magnet-coated nanoprobe core 172 supplies the high frequency magnetic write-field 176 for magnetization of each information bit on a magnetic recording disk 174. In an alternative design of FIG. 21, the magnetizing field is supplied in a more global manner from underneath the recording media, which simplifies the recording head design.

For ultra-high-density magnetic read/write, for example a patterned media with each magnetic bit size to write or to read being in the nanometer regime, the desired soft magnetic coated nanoprobe tip for the inventive read/write head should have a small tip radius of curvature comparably to the diameter of magnetic bit size. For a 1.6 terabit per square inch recording density, the bit size is estimated to be ~10 nm diameter with a 10 nm spacing. For a 6.4 terabit per square inch recording density, the bit size is estimated to be ~5 nm diameter with a 5 nm spacing. The desired tip sharpness is dependent on the recording density of the hard disk media, and is generally in the range of ~1-20 nm, preferably 1-5 nm. The applied field is concentrated into a small volume near the tip for effective magnetization writing on a hard disk recording media. Such a small tip end, if it were alone, could behave as a single domain magnet with an undesirable high coercive force, however, the thicker diameter regions immediately above the tip region will be magnetically softer and can be easily magnetically switched, thus causing the tip region to magnetically switch easier. The tapered geometry of the magnetic read/write head in FIGS. 15, 20 and 21 is therefore important.

The recording write head of FIGS. 15, 20 and 21 can also be used as a read head, as the magnetic signal emanating from each of the recorded magnetic bits on the disk surface causes inductive voltage signal in the sense coil positioned around the soft magnetic nanoprobe core.

The inventive sharp probe fabricated by using the EBID processing can also be utilized as a high power field emitting tip if proper vacuum environment of e.g., better than ~$10^{-5}$ torr is provided as the sharp tip configuration of nanocone or the high aspect ratio nanotubes provide very high local electric field concentration and easier field emission for relatively low applied voltage. Referring to the drawings, FIGS. 22(a)-(d) schematically illustrate various configuration of the inventive probe or an array of probes suitable for field emission devices. A carbon nanotube 180 (FIG. 22(a)), nanocone 182 (FIG. 22(b)), bent nanocone or nanotube 184 (FIG. 22(c)), or a nanocone 186 coated with lower work function material for easier field emission (FIG. 22(d)) can be utilized. The lower work function coating material can be selected from a number of materials. For example, $LaB_6$ type rare earth borides, or conductive carbides conductive nitrides such as refractory metal carbides and nitrides (e.g., HfC, TaC, WC, ZrC, NbC, MoC, TiC, VC, $Cr_3C_2$ and their variations in stoichiometry, and HfN, TaN, WN, ZrN, NbN, MoN, TiN, VN, CrN), as well as some rare earth carbides and nitrides (e.g., cerium nitride) can be utilized. These materials exhibit work function values much lower than that of carbon nanotube which has a similar value as for graphite.

Figure 22:
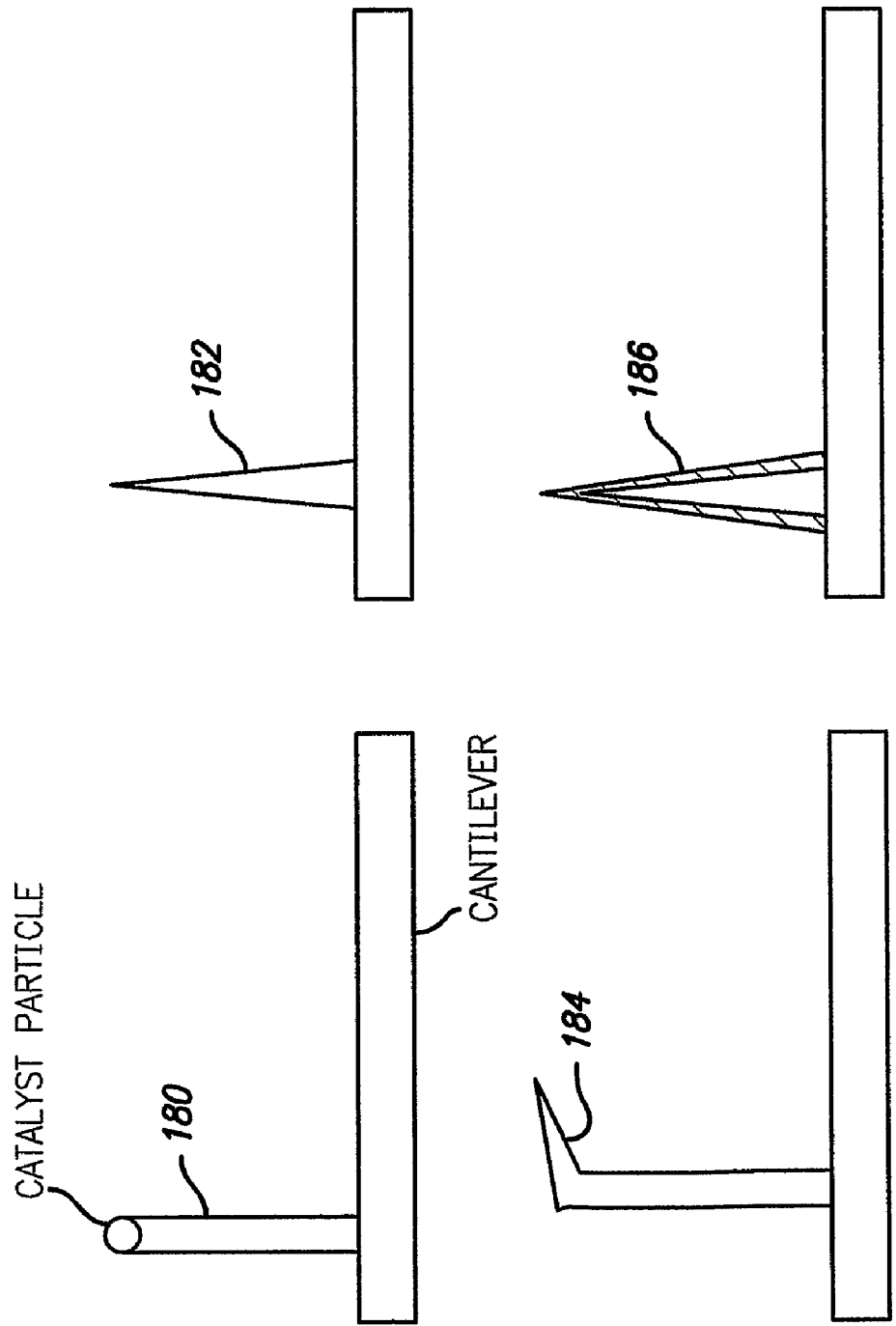
FIG. 22 schematically illustrates various field emission devices using the inventive nanotube or nanocone probe or an array of probes, according to the invention.
Figure 23:
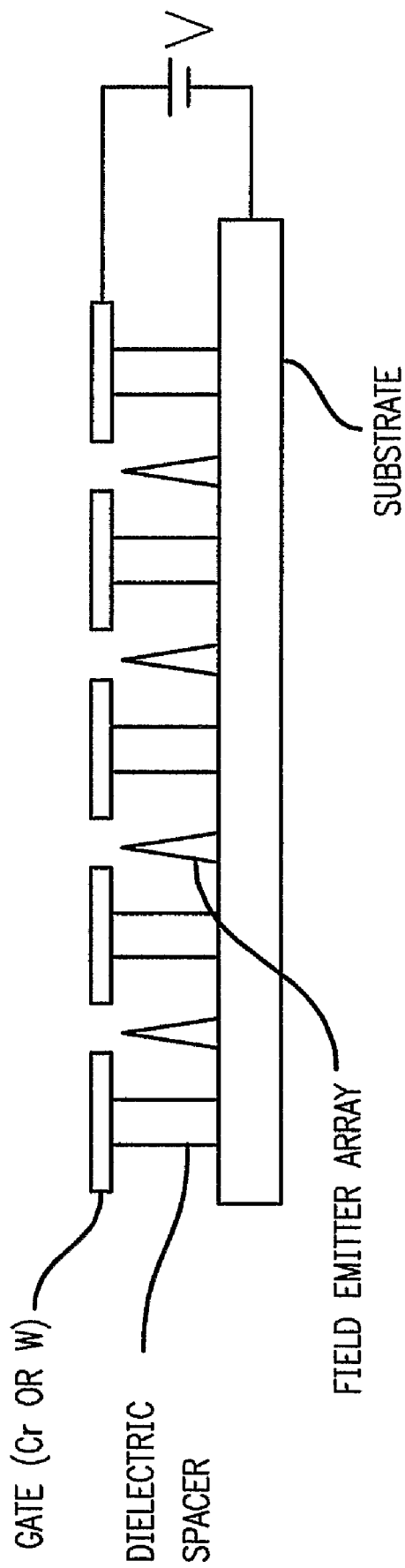
FIG. 23 schematically illustrates a gated field emitter array using the nanotube or nanocone array, made by the inventive process.

An array of field emitters with the emitter configuration of FIG. 22 can be fabricated using the EBID processing as illustrated in FIG. 23. The catalyst islands for carbon nanocone nucleation and growth can conveniently be EBID-fabricated before the gate array structure is constructed. The catalyst islands are protected by the carbon island itself and optionally by additional protective coatings, such as a polymer, during the gate fabrication etching processes. After the gate fabrication is completed, the protective carbon or polymer coating is removed by either reactive ion etch or chemical dissolution, to expose the catalyst island for subsequent CVD growth of carbon nanocones. Alternatively, the carbon nanocones can be first fabricated using the EBID process, which are then protected by potting with a polymer or inorganic material during gate fabrication, then the protective material is removed after the gate formation.

Figure 24:
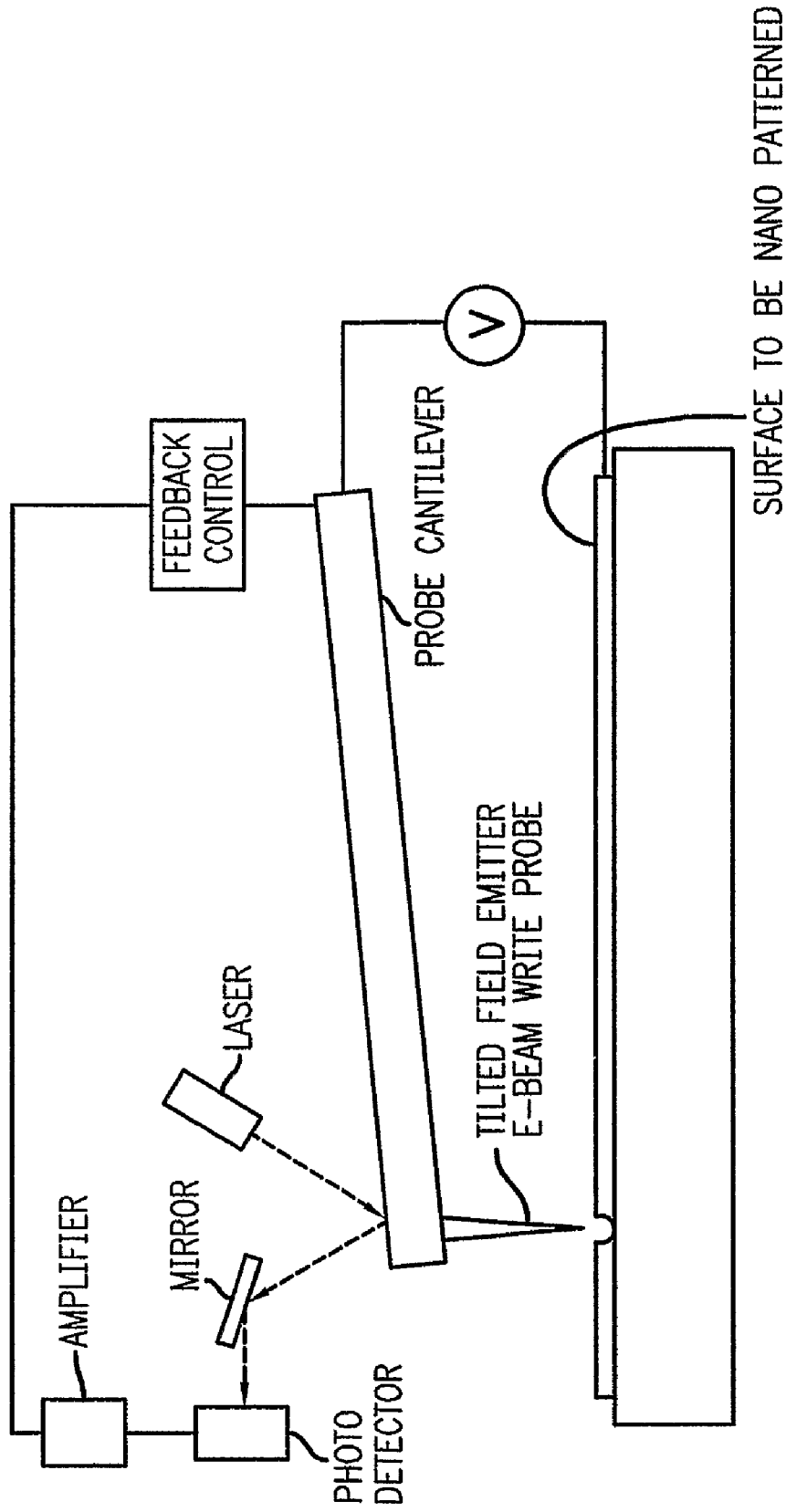
FIG. 24 schematically illustrates an exemplary field-emission-based nano-write and nano-patterning system combined with AFM operation according to the invention.

A single probe carbon nanocone field emitter in combination with the AFM laser-guided operating principle, according to the invention, can be utilized as a nanoscale field emission e-beam evaporator as illustrated in FIG. 24. Such a system illustrated in FIG. 24, can be useful for nano machining patterning of dots, lines, or circles on a thin film layer such as a conductor, a semiconductor or an insulator layer as a means of nanomachining, nano patterning, e.g., for semiconductor circuit interconnection fabrication, magnetic recording media fabrication (especially a master mold for subsequent nano imprint production of magnetic recording media) or e-beam evaporation writing of non-magnetic recording media such as compact discs (CDs) for optical reading, or thermally writing (using the heating effect of e-beam radiation) of crystal structure phase change type recording media material (for example, amorphous vs crystalline structure) or thermoplastic recording media material.

Figure 25:
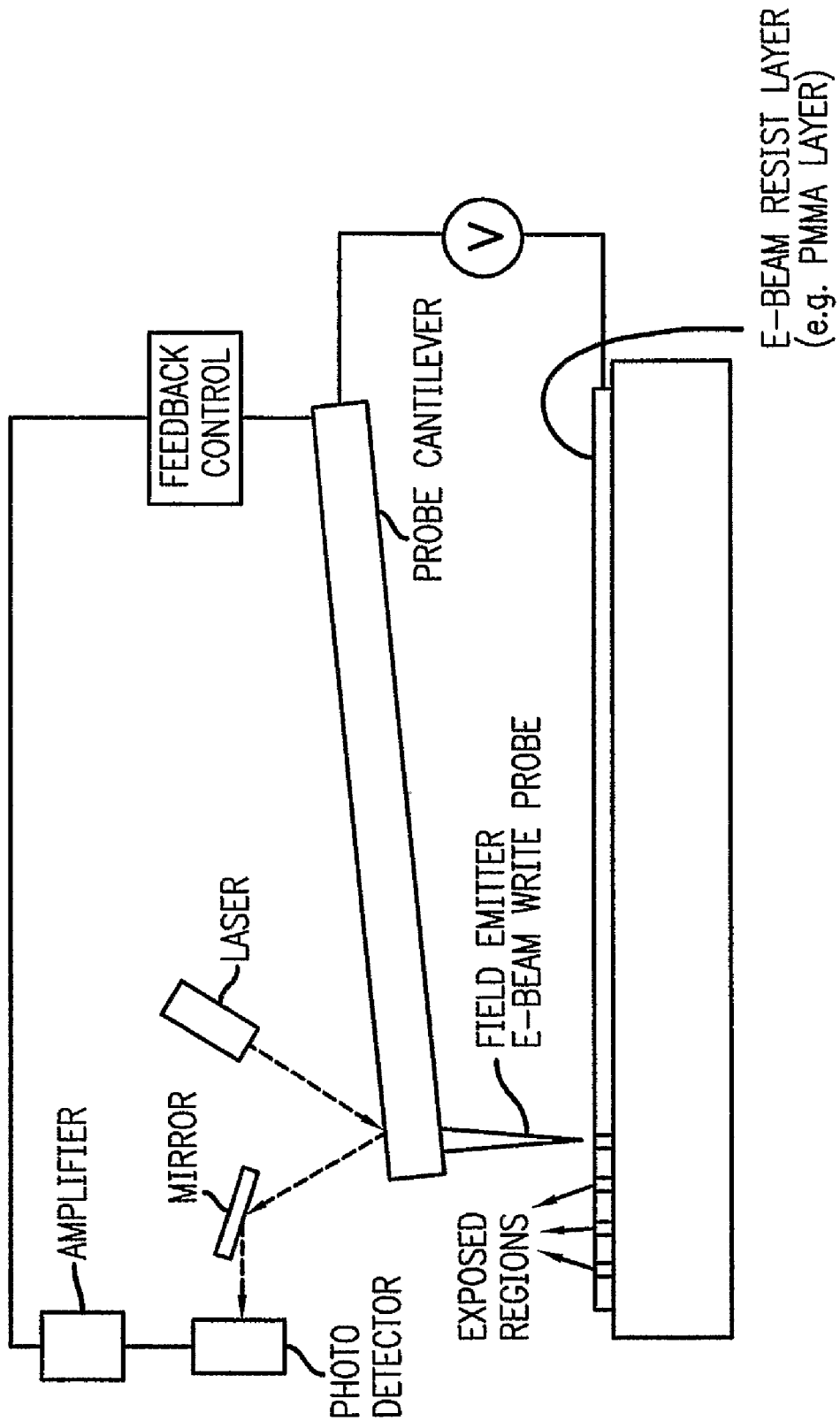
FIG. 25 represents a schematic illustration of an exemplary AFM-mounted, electron beam exposing single-probe field emitter for nanopatterning.

Alternatively, a lower power electron emission can be utilized to give electron beam exposure of local spots in the e-beam sensitive resist layer, such as PMMA (Polymethyl methacrylate) coating for creation of nanopatterning. The local exposure of island or line patterning is carried out directly under the tip of the probe mounted on AFM, which emits sufficient electrons to cause chemical changes in the e-beam resist material for subsequent development into patterns as illustrated in FIG. 25. Either a single or a multi-emitter configuration can be used. The nanopatterns generated can be either an island array or nano-cavity array depending on the type of e-beam resist materials (positive vs negative resist) or on the mode of e-beam exposure. The nanopatterns can also have other configurations or lines, circles, rectangles or other random configurations. After the e-beam exposure, the underlying material, for example, a semiconductor layer or magnetic recording material, can be patterned by using follow-up fabrication steps comprising some of the well-known silicon fabrication and patterning processes, such as a lift-off process, reactive ion etch process or chemical etching process.

It is understood that the above-described embodiments are illustrative of only a few of the many possible specific embodiments which can represent applications of the invention. Numerous and varied other arrangements can be made by those skilled in the art without departing from the spirit and scope of the invention. For example, the sidewall of the nanoprobes in this invention may be coated with an insulating polymer or ceramic layer so as to minimize electrical current leakage in electronic or ionic conductance measurements in liquid solution or biological environment.

INDUSTRIAL APPLICABILITY

Systems comprising the inventive nanoprobes include atomic force microscopy (AFM) probes, MFM probes, Sidewall Test Probes, Mechanical Tester Probes, Nano-indent Mechanical Testers, Conductance Probes, Heat-Assisted Write Probes, and Magnetic Recording and Reading Probes. The applications of the EBID fabricated nanoprobes for e-beam patterning of nanostructures (FIGS. 24 and 25) are also embodiments of the invention.

Having thus described the invention, we claim:

1. A mechanically stable carbon nanotube, having a scanning probe tip comprising an oriented carbon nanotube having a carbon-island-defined base with a gradually decreasing diameter, with a sharp point at the probe tip.

2. The carbon nanotube probe of claim 1 wherein the probe tip is straight, angled, sharply bent, or zig-zag bent.

3. An atomic force microscope capable of metrology on a flat surface or a sidewall, having a probe tip made of the carbon nanotube probe of claims 1 or 2.

4. The carbon nanotube probe of claim 1 in which the carbon nanotube comprises a larger-sized nanocone base and a smaller-sized, thinner nanotube probe, at the apex of the larger-sized base.

5. The carbon nanotube probe of claims 1, 2 or 4, in which the carbon nanotube probe tip is placed on a raised pedestal to increase the total length of the probe.

6. The carbon nanotube of claim 1 comprising an array of said nanotubes in which the sharp tips are straight, angled or sharply bent.

7. The carbon nanotube probe of claim 1, affixed on a cantilever, in which the probe tip is tilted.

8. The tilted carbon nanotube probe tip of claim 7 in which the probe tip is tilted at least 15 degrees with respect to the normal direction of the cantilever surface.

9. The carbon nanotube of claim 1, having a very sharp tip, and a cone shaped base, the base diameter being at least 100 nm, with a ratio of nanotube length to cone base diameter of at least 2.

10. The carbon nanotube of claim 9 in which the ratio of nanotube length to cone base diameter is at least 5.

11. The carbon nanotube of claim 9 in which the ratio of nanotube length to cone base diameter is at least 10.

12. The carbon nanotube probe of claim 1 wherein the surface of the probe tip is coated with an electrically conductive layer.

13. The conductively coated carbon nanotube probe of claim 12 wherein the coating material is selected from metals or conductive carbide materials.

14. A single or an array of electron-field-emitting nanoprobe systems having a probe tip which is made of the carbon nanotube probe of claims 1, 12 or 13.

15. The electron-field-emitting nanoprobe system of claim 14 wherein the probe tip is a laser-guided nanomachining tip capable of e-beam ablation of a portion of a target surface.

16. The electron-field-emitting nanoprobe system of claim 14 wherein the probe tip is a laser-guided, nanoscale e-beam exposure writer on an electron beam resist layer coated on a substrate for nanopatterning.

17. The carbon nanotube probe of claims 1 or 12 wherein the tip of the probe is sharpened by electric field induced diffusion of atoms.

18. A nanoscale conductance probe system having a probe tip which is made of the carbon nanotube probe of claim 12.

19. The carbon nanotube probe of clam 1 wherein the surface of the probe tip is coated with an electrically insulating layer, except for the tip region.

20. The carbon nanotube probe of claim 1 wherein the surface of the probe tip is coated with a soft magnetic layer.

21. A heat-assisted write probe having a probe tip which is made of the carbon nanotube probe of claims 1, 12 or 20 and the heating is carried out by high frequency induction heating or resistive heating.

22. The carbon nanotube probe of claim 1 wherein the surface of the probe tip is coated with a high coercivity hard magnetic layer.

23. A magnetic read/write head having a probe tip which is made of the carbon nanotube probe of claims 1, 20 or 22.

24. The magnetic read/write head of claim 23 wherein the head also comprises a magnetic-field-generating or magnetic field-detecting solenoid.

25. The carbon nanotube probe of claim 1 wherein a portion of the surface of the probe tip is coated with a locking layer for enhanced adhesion and mechanical stability of the probe on a supporting substrate.

26. A nano-indentor mechanical test system having a probe tip which is made of the carbon nanotube probe of claim 1.

* * * * *